(12) United States Patent
Kuzuya

(10) Patent No.: US 8,379,725 B2
(45) Date of Patent: Feb. 19, 2013

(54) MOTION-VECTOR SEARCHING METHOD AND MOTION-VECTOR SEARCHING APPARATUS

(75) Inventor: Naoki Kuzuya, Tokyo (JP)

(73) Assignee: Sony Corporation, Tokyo (JP)

( * ) Notice: Subject to any disclaimer, the term of this patent is extended or adjusted under 35 U.S.C. 154(b) by 1465 days.

(21) Appl. No.: 11/734,151

(22) Filed: Apr. 11, 2007

(65) Prior Publication Data

US 2007/0242752 A1 Oct. 18, 2007

(30) Foreign Application Priority Data

Apr. 12, 2006 (JP) ................................ 2006-110139

(51) Int. Cl.
*H04N 7/12* (2006.01)
*G06K 9/00* (2006.01)

(52) U.S. Cl. .................................. 375/240.16; 382/253

(58) Field of Classification Search ................. 375/240, 375/240.01–240.29, 241, 253; 345/202, 345/419, 501, 351, 539, 632, 723; 725/151
See application file for complete search history.

(56) References Cited

U.S. PATENT DOCUMENTS

| | | | | |
|---|---|---|---|---|
| 5,400,087 A | * | 3/1995 | Uramoto et al. | 348/699 |
| 5,510,857 A | * | 4/1996 | Kopet et al. | 348/699 |
| 6,122,317 A | * | 9/2000 | Hanami et al. | 375/240.16 |
| 6,249,550 B1 | * | 6/2001 | Mizuno et al. | 375/240.24 |
| 7,099,393 B2 | * | 8/2006 | Arita et al. | 375/240.16 |
| 7,302,015 B2 | * | 11/2007 | Kim et al. | 375/327 |
| 7,453,940 B2 | * | 11/2008 | Gallant et al. | 375/240.14 |
| 2004/0008779 A1 | * | 1/2004 | Lai et al. | 375/240.16 |

FOREIGN PATENT DOCUMENTS

| | | |
|---|---|---|
| JP | HEI 07-203457 | 8/1995 |
| JP | HEI 10-01385 | 1/1998 |
| JP | HEI 10-075455 | 3/1998 |
| JP | HEI 11-041604 | 2/1999 |
| JP | 2005-302021 | 10/2005 |
| JP | 2005-530420 | 10/2005 |

OTHER PUBLICATIONS

"A New Diamond Search Algorithm for Fast Block-Matching Motion Estimation," IEEE Transactions on Image Processing, vol. 9, No. 2, Feb. 2000.*

Ahmad et al. Video compression with parallel processing, Parallel Computing 28 (2002) 1039-1078.*

Office Action issued on Oct. 10, 2010 for corresponding Japanese patent application 2006-110139.

* cited by examiner

*Primary Examiner* — Saleh Najjar
*Assistant Examiner* — Shu Chun Gao
(74) *Attorney, Agent, or Firm* — K&L Gates LLP

(57) ABSTRACT

A motion-vector searching method is provided. The motion-vector searching method includes the steps of: reading out observed processing blocks and reading out reference processing blocks; concurrently computing partial evaluation values for each of a plurality of position vectors; obtaining a total evaluation value for each particular one of the position vectors; and finding the motion vector as an optimum position vector determined by comparison of the total evaluation values each obtained for one of the position vectors with each other.

9 Claims, 34 Drawing Sheets

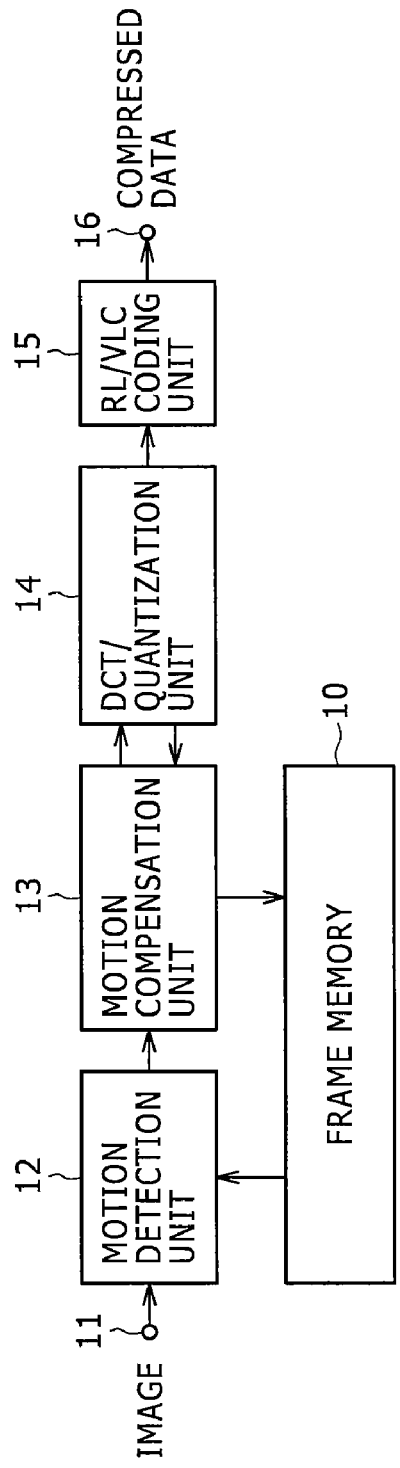
F I G. 1
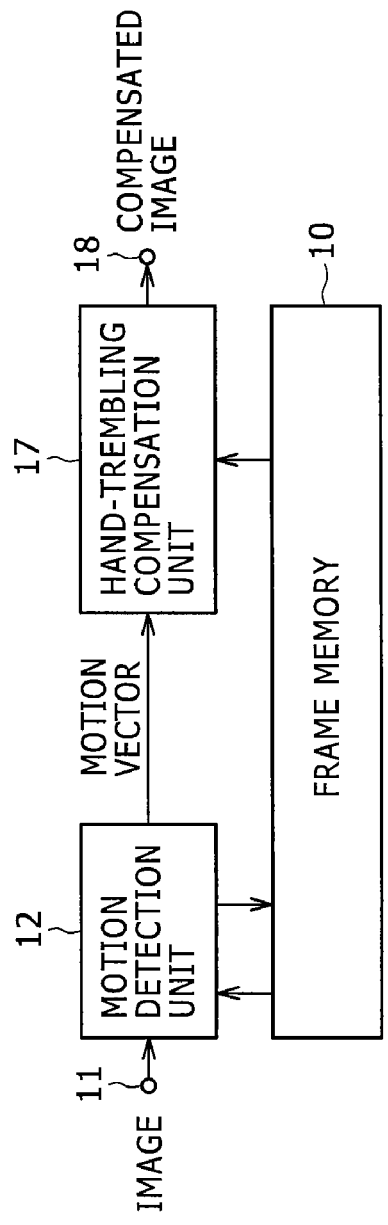
F I G. 2

FIG.5A  FIG.5B
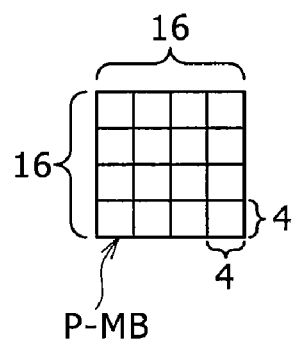
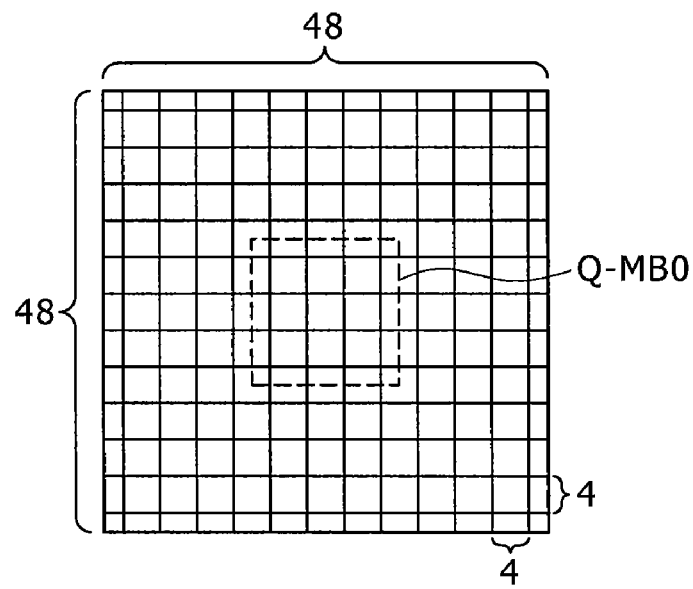
FIG.6
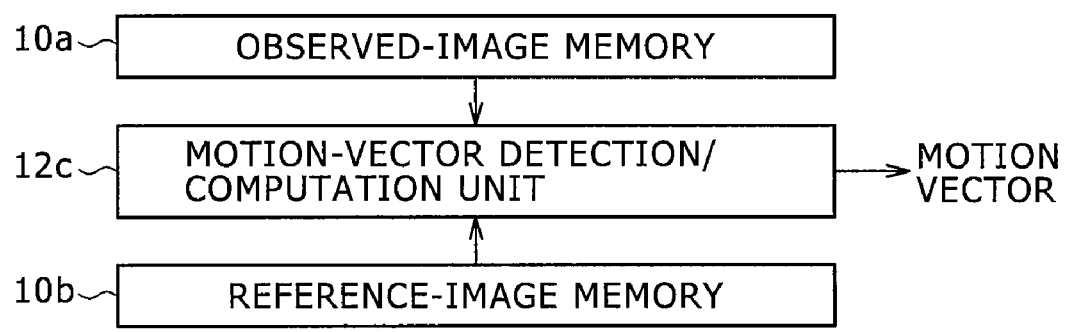

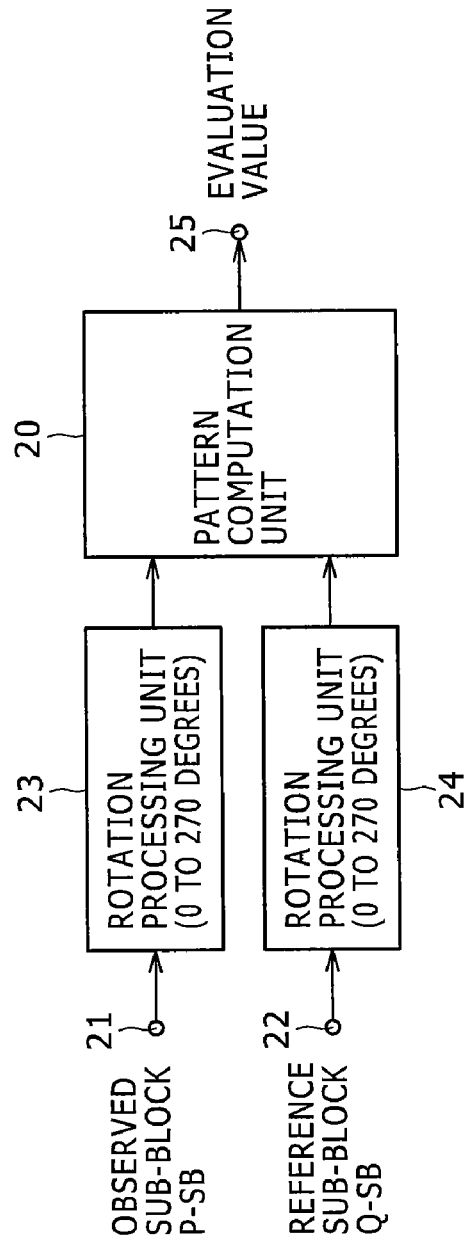
FIG. 17
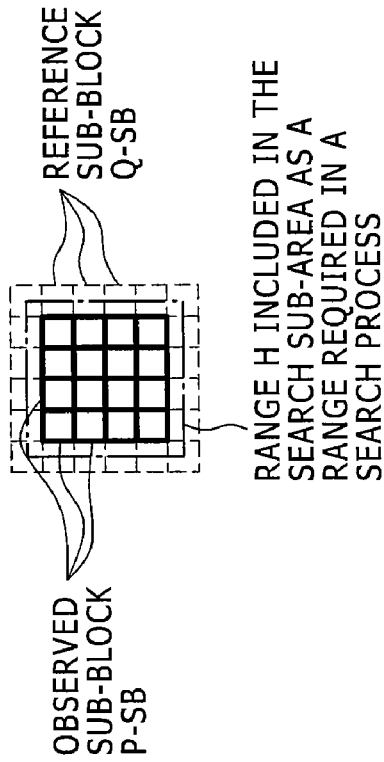
FIG. 19
FIG. 18

PIXELS TO BE CONSIDERD FOR (-1,-1)

PIXELS TO BE CONSIDERD FOR (1,-1)

PIXELS TO BE CONSIDERD FOR (-1,1)

PIXELS TO BE CONSIDERD FOR (1,1)

PIXELS TO BE CONSIDERD FOR (-2,0)

PIXELS TO BE CONSIDERD FOR (0,-2)

PIXELS TO BE CONSIDERD FOR (0,2)

PIXELS TO BE CONSIDERD FOR (2,0)

FIG.24

| vec (2,0) | vec (1,-1) | vec (0,-2) | vec (1,-1) | vec (2,0) | vec (1,1) | vec (0,2) | vec (1,1) |
|---|---|---|---|---|---|---|---|
| 128/256 | 144/256 | 128/256 | 144/256 | 128/256 | 144/256 | 128/256 | 144/256 |

PIXELS TO BE CONSIDERD FOR (-1,-1)

PIXELS TO BE CONSIDERD FOR (1,-1)

PIXELS TO BE CONSIDERD FOR (-1,1)

PIXELS TO BE CONSIDERD FOR (1,1)

PIXELS TO BE CONSIDERD FOR (-2,0)

PIXELS TO BE CONSIDERD FOR (0,-2)

PIXELS TO BE CONSIDERD FOR (0,2)

PIXELS TO BE CONSIDERD FOR (2,0)

FIG.28

| vec (2,0) | vec (1,-1) | vec (0,-2) | vec (-1,-1) | vec (-2,0) | vec (-1,1) | vec (0,2) | vec (1,1) |
|---|---|---|---|---|---|---|---|
| 224/256 | 180/256 | 128/256 | 180/256 | 224/256 | 180/256 | 128/256 | 180/256 |

FIG.30A
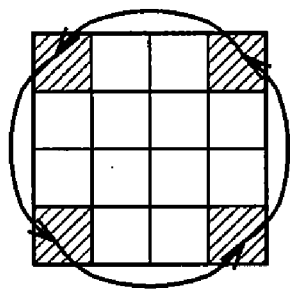
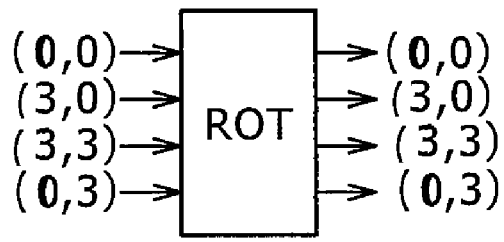
FIG.30B
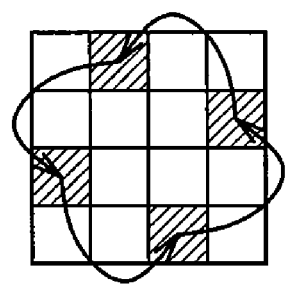
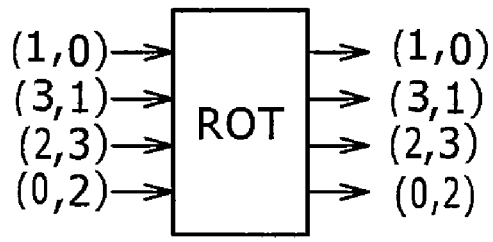
FIG.30C
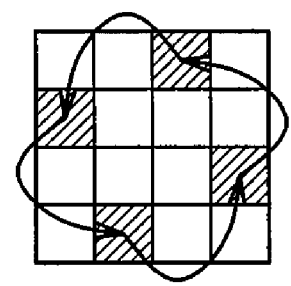
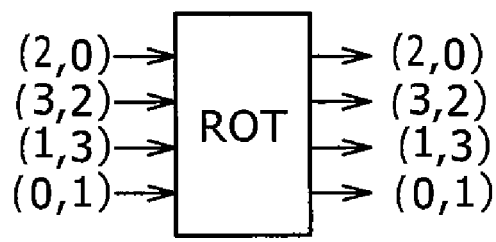
FIG.30D
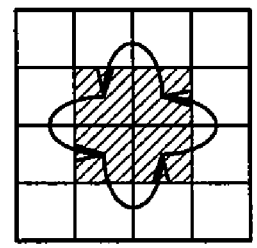
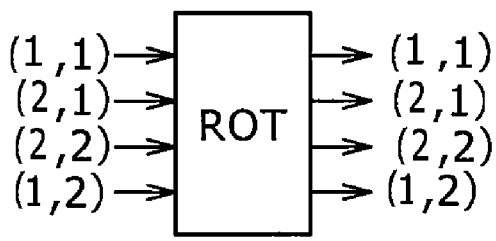

vec {1.5,-1}   vec {0.5,-1} vec {1.5,0}    vec {0.5,0}

FIG.37
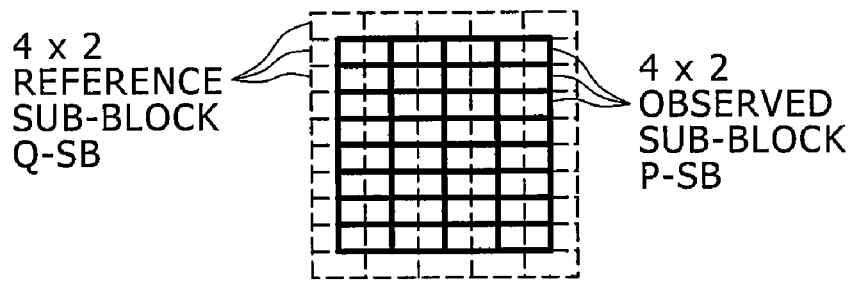
FIG.38
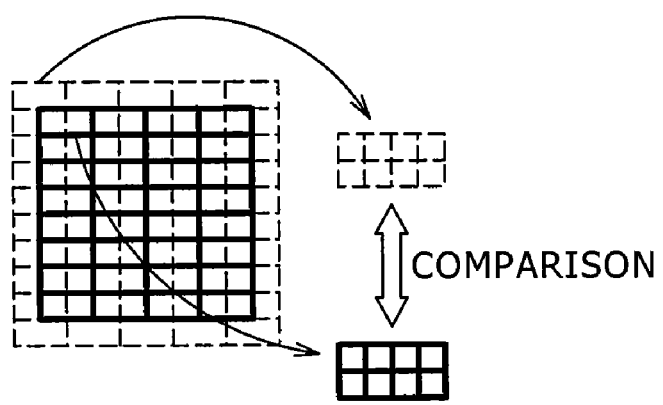
FIG.39
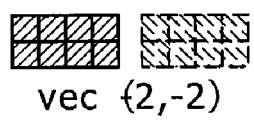
vec (2,-2)
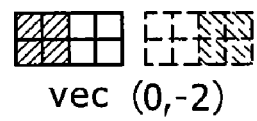
vec (0,-2)
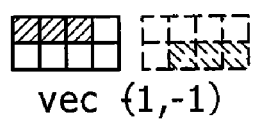
vec (1,-1)

FIG.40
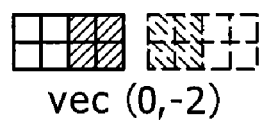
vec (0,-2)
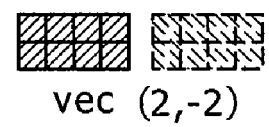
vec (2,-2)
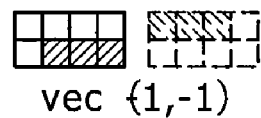
vec (1,-1)
FIG.41
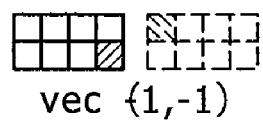
vec (1,-1)
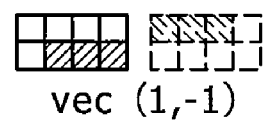
vec (1,-1)
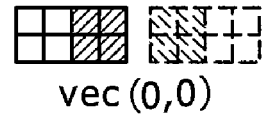
vec (0,0)
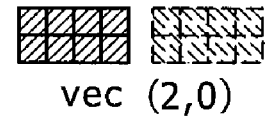
vec (2,0)
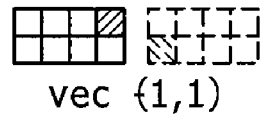
vec (1,1)
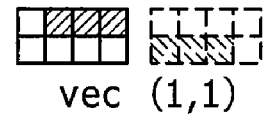
vec (1,1)

FIG.42
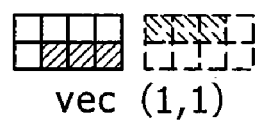
vec (1,1)
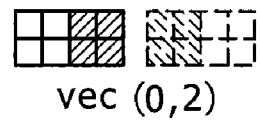
vec (0,2)
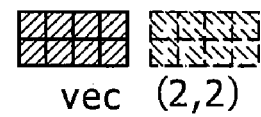
vec (2,2)
FIG.43
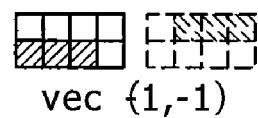
vec {1,-1)
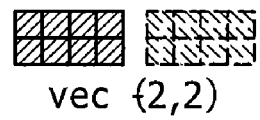
vec {2,2)
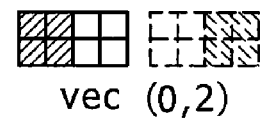
vec (0,2)

FIG.46
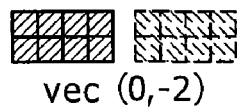
vec (0,-2)
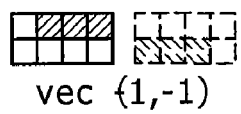
vec (1,-1)
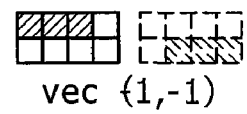
vec (1,-1)
FIG.47
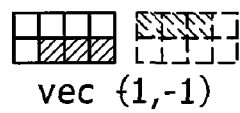
vec (1,-1)
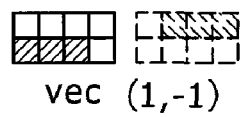
vec (1,-1)
vec (2,0)
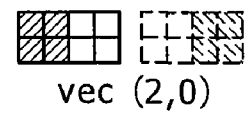
vec (2,0)
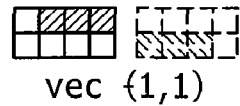
vec (1,1)
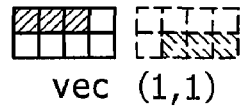
vec (1,1)
FIG.48
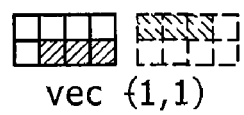
vec (1,1)
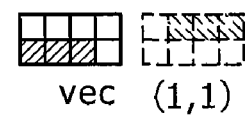
vec (1,1)
vec (0,2)
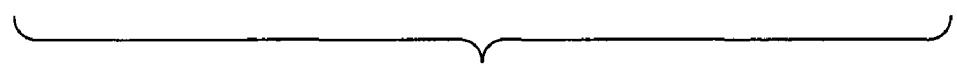

PIXELS TO BE CONSIDERD FOR (-1,-1)

PIXELS TO BE CONSIDERD FOR (1,-1)

PIXELS TO BE CONSIDERD FOR (-1,1)

PIXELS TO BE CONSIDERD FOR (1,1)

PIXELS TO BE CONSIDERD FOR (-2,0)

PIXELS TO BE CONSIDERD FOR (0,-2)

PIXELS TO BE CONSIDERD FOR (0,2)

PIXELS TO BE CONSIDERD FOR (2,0)

FIG.53A   FIG.53B
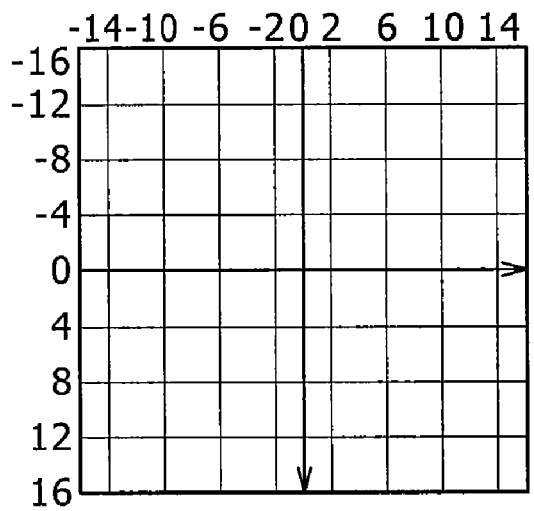
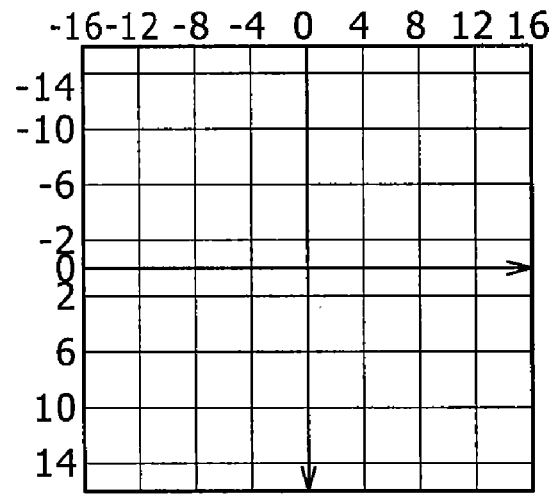
FIG.54
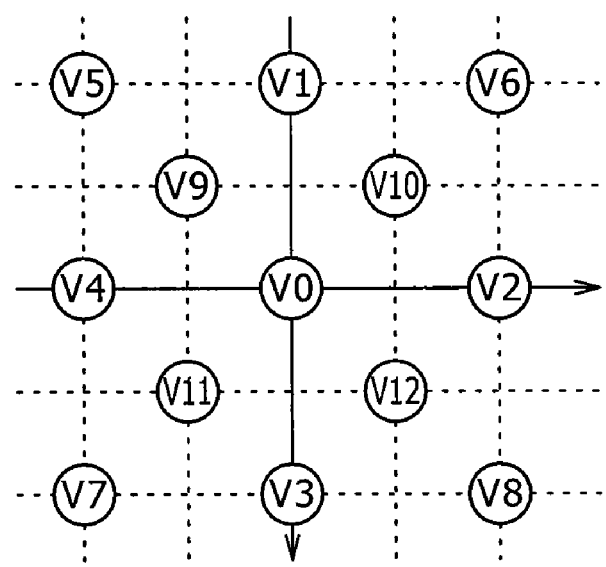

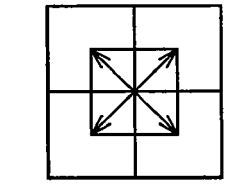

FIG.55D NEXT OPERATION IS THE SEARCH PROCESS Sb (SIMPLE SEARCH PROCESS)

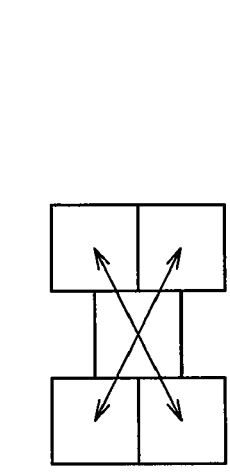

FIG.55C NEXT OPERATION IS THE SEARCH PROCESS Sd

FIG.55B NEXT OPERATION IS THE SEARCH PROCESS Sc

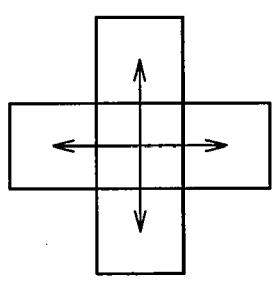

FIG.55A NEXT OPERATION IS THE SEARCH PROCESS Sa

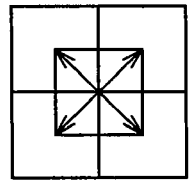

FIG.56D NEXT OPERATION IS THE SEARCH PROCESS Sa (SIMPLE SEARCH PROCESS)

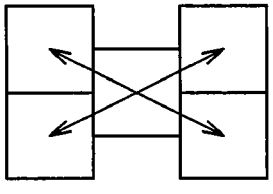

FIG.56C NEXT OPERATION IS THE SEARCH PROCESS Sc

FIG.56B NEXT OPERATION IS THE SEARCH PROCESS Sd

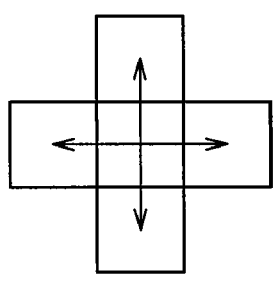

FIG.56A NEXT OPERATION IS THE SEARCH PROCESS Sb

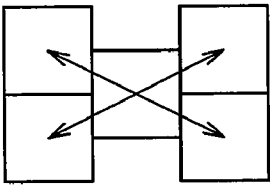 FIG.57A NEXT OPERATION IS THE SEARCH PROCESS Sc

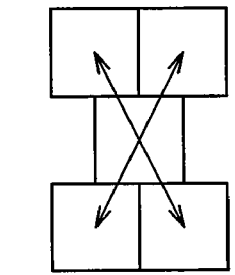 FIG.57B NEXT OPERATION IS THE SEARCH PROCESS Sa

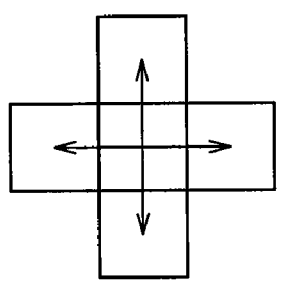 FIG.57C NEXT OPERATION IS THE SEARCH PROCESS Sb

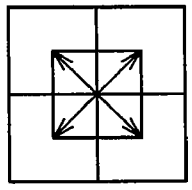 FIG.57D NEXT OPERATION IS THE SEARCH PROCESS Sd (SIMPLE SEARCH PROCESS)

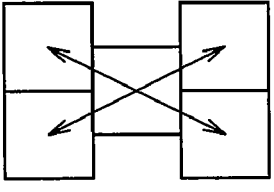 FIG.58A NEXT OPERATION IS THE SEARCH PROCESS Sd

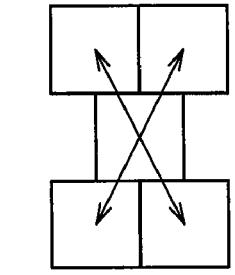 FIG.58B NEXT OPERATION IS THE SEARCH PROCESS Sb

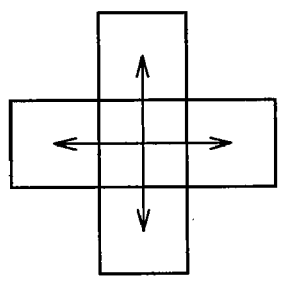 FIG.58C NEXT OPERATION IS THE SEARCH PROCESS Sa

FIG.58D NEXT OPERATION IS THE SEARCH PROCESS Sc (SIMPLE SEARCH PROCESS)

SEARCH PROCESS Sa
(SIMPLE SEARCH
PROCESS) NEXT
OPERATION IS THE
SEARCH PROCESS Sb

SEARCH PROCESS Sb
(SIMPLE SEARCH
PROCESS) NEXT
OPERATION IS THE
SEARCH PROCESS Sa

SEARCH PROCESS Sc
(SIMPLE SEARCH
PROCESS) NEXT
OPERATION IS THE
SEARCH PROCESS Sd

SEARCH PROCESS Sd
(SIMPLE SEARCH
PROCESS) NEXT
OPERATION IS THE
SEARCH PROCESS Sc

MOTION-VECTOR SEARCHING METHOD AND MOTION-VECTOR SEARCHING APPARATUS

CROSS REFERENCES TO RELATED APPLICATIONS

The present application claims priority to Japanese Patent Application JP 2006-110139, filed in the Japan Patent Office on Apr. 12, 2006, the entire contents of which is being incorporated herein by reference.

BACKGROUND

The present application relates to a motion-vector searching method for searching for a motion vector indicating a movement to an observed image of an input picture from a reference image included in the input picture as an image separated away along the time axis from the observed image by a small time difference by execution of the steps of dividing the observed image into a plurality of observed blocks, dividing the reference image into a plurality of reference blocks and comparing the reference blocks with a selected one of the observed blocks, as well as relates to a motion-vector searching apparatus adopting the motion-vector searching method.

In general, the processing to compress a moving picture includes a process to detect a motion vector indicating a movement from a reference frame to an observed frame separated away from the reference frame along the time axis by a small time difference and make use of the motion vector to carry out a motion compensation prediction coding operation. In this specification, a motion vector is also referred to as an optimum position vector. The process to detect a motion vector of a moving picture is also applied to processing to compensate an image for an effect of hand trembling experienced by a digital camera. The process to detect a motion vector may adopt one of a variety of available methods including a generally known block matching method. In accordance with the block matching method, a motion vector indicating a movement to an observed image of an input picture from a reference image included in the input picture as an image separated away along the time axis from the observed image by a small time difference is detected by execution of the steps of dividing the observed image into a plurality of observed blocks, dividing the reference image into a plurality of reference blocks and comparing the reference blocks in a search area with a selected one of the observed blocks in order to search the search area for a reference block most similar to the selected observed block. To put it in detail, the selected observed block is compared with each of a plurality of aforementioned reference blocks in the search area in order to find evaluation values each representing the degree of similarity and determine the highest degree of similarity.

Such a process to detect a motion vector is known as processing having a very large amount of computation. By the way, the process to detect a motion vector is referred to as a process to search for a movement, a process to estimate a movement, a process to infer a movement or a process to calculate a movement to mention a few. On the other hand, processing to process a moving picture having a high frame rate to result in a picture with a good quality is also required. For this reason, increasing the processing speed of a process to search for a motion vector becomes an important technological theme. The processing speed of a process to search for a motion vector can be increased by reducing the amount of processing and/or implementing parallel processing.

In addition, reducing the power consumption of a device for carrying out the process to search for a motion vector also becomes an important technological theme as well. As already generally known, the power consumption of the device can be reduced most effectively by decreasing the operating frequency of the device. For this reason, by the same token, reduction of the amount of processing and/or implementation of parallel processing are indispensable to efforts to reduce the power consumption.

By the way, in order to increase the processing speed of the process to search for a motion vector, a variety of speed-increasing methods have been proposed. The proposed speed-increasing methods include search-type methods represented by a diamond search technique disclosed in non-patent document 1 listed below. By adoption of the diamond search method, it is possible to increase the processing speed of the process to search for a motion vector while sustaining a high picture quality. In accordance with the diamond search method, first of all, a vector existing on a position-vector plane is determined. Then, an area surrounding the vector is taken as the first search area. Subsequently, vectors in the first search area are compared with each other in order to determine an optimum vector oriented in a direction in which a next search area including vectors with smaller values is separated away from the first search area. Then, the next search area is set as the second search area. These operations are carried out repeatedly till eventually the evaluation value becomes a minimum at the center of the set search area or the boundary of the entire search area (or the entire picture) is undesirably exceeded. By adopting this method, the number of vectors to be searched for a full search process can be reduced substantially. In this method, however, a technique to further increase the processing speed of the process to search for a motion vector corresponding to the minimum evaluation value is not taken into account.

In addition, parallel processing is absolutely required in the effort to increase the processing speed of the process to search for a motion vector. A technology for loading data from a memory with a high degree of efficiency is of importance to implementation of the parallel processing. An architecture for loading data from a memory with a high degree of efficiency has been proposed as described in documents such as patent document 1 listed below. By adoption of a method based on this proposed technology, it is possible to carry out processes to compute evaluation values of vectors as parallel processing. By the way, patent document 1 does not describe a method for further increasing the processing speed of the process to search for a motion vector. In order to further increase the processing speed of the process to search for a motion vector, it is necessary to convert computation for each vector into a parallel process and to carry out the computation processes for all vectors concurrently.

Non-patent Document 1: S. Zhu and K. Ma, "A New Diamond Search Algorithm for Fast Block Matching Motion Estimation," International Conference on Information, Communications and Signal Processing ICICS '97 Singapore, 9-12 Sep. 1997.

Patent Document 1: Japanese Patent Laid-open No. 2005-530420.

SUMMARY

In an embodiment, a motion-vector searching method is provided that is capable of reducing the amount of the entire computation to search for a motion vector and reducing the power consumption of the computation as well as innovated a motion-vector searching apparatus for implementing the motion-vector searching method.

In accordance with the motion-vector searching apparatus and the motion-vector searching method of an embodiment, a process to search for a motion vector indicating a movement to an observed image of an input picture from a reference image included in the input picture as an image separated away along the time axis from the observed image by a small time difference is carried out by execution of the steps of dividing the observed image into a plurality of observed blocks, dividing the reference image into a plurality of reference blocks and comparing the reference blocks with a selected one of the observed blocks. (in the following description, a block is also referred to as a macroblock.) In order to search for a motion vector for the selected observed block, observed processing blocks each included in the selected observed block as a processing unit for the selected observed block are read out from a memory for storing the selected observed block while reference processing blocks included in each of a plurality of reference blocks as processing units of a reference block are read out from a memory for storing the reference blocks. (in the following description, a processing block is also referred to as a sub-block.) Then, partial evaluation values representing relations between a plurality of observed sub-blocks of the selected observed block and reference sub-blocks each corresponding to one of the observed sub-blocks are computed concurrently for a reference block including the reference sub-blocks. The process to compute such partial evaluation values is carried out for each of a plurality of reference blocks included in a search area as reference blocks each pointed to by a position vector. Subsequently, the partial evaluation values representing relations between the observed sub-blocks of the selected observed block and reference sub-blocks composing a reference block pointed to by a position vector are summed up to result in a total evaluation value for the position vector. Finally, the total evaluation values each found for a position vector are compared with each other to determine an optimum total evaluation value found for a position vector, which is referred to as a motion vector for the selected observed block.

As is evident from the above description, each observed block stored in the memory for storing the observed block is divided into a plurality of observed sub-blocks each also referred to as an observed processing block whereas every reference block stored in the memory for storing reference blocks is divided into a plurality of reference sub-blocks each also referred to as a reference processing block. The observed sub-blocks and the reference sub-blocks are read out respectively from the memory for storing the observed block and the memory for storing reference blocks.

The process to search for a motion vector as described above is the so-called coarse-grain search process carried out by first computing a total evaluation value for each of some position vectors and, then, determining an optimum total evaluation value found for a position vector, which is referred to as a motion vector for a selected observed block. It is desirable, however, to further carry out an accurate search process to search the vicinity of an area corresponding to a reference block pointed to by a motion vector detected in the coarse-grain search process for an accurate motion vector for the selected observed block. In the accurate search process, the area corresponding to the reference block pointed to by the motion vector detected in the coarse-grain search process is used as a substitute for the search area and the pixel unit is used as the processing unit replacing the observed sub-block and the reference sub-block.

According to an embodiment, the amount of the whole computation to search for a motion vector can be reduced. In addition, by carrying out the computation as parallel processing, the amount of computation per search unit cycle can be increased so that the operating frequency can be made relatively low and, hence, the power consumption can be reduced.

Additional features and advantages are described herein, and will be apparent from, the following Detailed Description and the figures.

BRIEF DESCRIPTION OF THE FIGURES

FIG. 1 is a block diagram showing a typical configuration of a moving-picture compression apparatus according to an embodiment;

FIG. 2 is a block diagram showing a typical configuration of a hand-trembling compensation apparatus according to the embodiment;

FIG. 5A is a diagram showing a macroblock of an observed image whereas FIG. 5B is a diagram showing a search area on a reference image;

FIG. 6 is a circuit block diagram showing a typical configuration of a circuit employing a memory for storing an observed image, a memory for storing a reference image and a unit for detecting/computing a motion vector;

FIG. 8A is an explanatory diagram to be referred to in description of a first area division technique to divide a search range on the position-vector plane whereas

FIG. 9A is a diagram showing an initial search sub-area on the position-vector plane whereas FIG. 9B is a diagram showing a search sub-area to be selected as the next search sub-area;

FIG. 12A is a diagram showing a relation between the position of an observed macroblock and the positions of reference sub-blocks in a reference macroblock compared with the observed macroblock by comparing data of the sub-blocks whereas

FIG. 17 is a block diagram showing a typical configuration of a circuit for computing partial evaluation values by comparing an observed sub-block with a reference sub-block;

FIG. 18 is a diagram showing a typical search sub-area existing on the position-vector plane as a search sub-area obtained as a result of adopting the second area division technique and a typical group of position vectors each associated with the typical search sub-area as a vector for which a total evaluation value is computed;

FIG. 19 is a diagram showing a relation between the position of a search sub-area obtained as a result of adopting the second area division technique and the position of an observed macroblock;

FIG. 24 is a diagram showing pixel counts each representing the number of pixels selected from all the pixels of a macroblock as pixels to be used for computing evaluation values for each of the position vectors shown in FIGS. 22 and 23;

FIG. 28 is a diagram showing pixel counts each representing the number of pixels selected from all the pixels of a macroblock as pixels to be used for computing evaluation values for each of the position vectors shown in FIGS. 26 and 27 in the process shown in FIG. 25;

FIG. 30A is an explanatory diagram referred to in description of rotation processing carried out by a rotation processing unit employed in the motion-vector searching hardware shown in FIG. 29 to rotate the position of each pixel in a sub-block by zero degrees; FIG. 30B is an explanatory diagram referred to in description of rotation processing carried out by the rotation processing unit employed in the motion-vector searching hardware shown in FIG. 29 to rotate the position of each pixel in a sub-block by 90 degrees; FIG. 30C is an explanatory diagram referred to in description of rotation processing carried out by the rotation processing unit employed in the motion-vector searching hardware shown in FIG. 29 to rotate the position of each pixel in a sub-block by 180 degrees; and FIG. 30D is an explanatory diagram referred to in description of rotation processing carried out by the rotation processing unit employed in the motion-vector searching hardware shown in FIG. 29 to rotate the position of each pixel in a sub-block by 270 degrees;

FIG. 31A is a diagram showing position vectors handled in a coarse-grain search process whereas

FIG. 36A is a diagram showing an observed macroblock divided into 32 observed sub-blocks each having a size of 2×4 pixels in accordance with a second modified version of the embodiment whereas FIG. 36B is a diagram showing a search area included in a reference image as an area divided into reference sub-blocks each also having a size of 2×4 pixels reference image in accordance with the second modified version;

FIG. 37 is a diagram showing a relation between the positions of observed sub-blocks composing an observed macroblock and the positions of reference sub-blocks obtained as a result of applying the first division technique to the second modified version;

FIG. 38 is a diagram showing a process to compare an observed sub-block with a reference sub-block located at the upper-left side of the observed sub-block in order to compute partial evaluation values in the second modified version;

FIG. 39 is a diagram showing typical pixel-data patterns each included in an observed sub-block as a pattern to be compared with a typical pixel-data pattern in a corresponding reference sub-block in a process to compute a total evaluation value for a position vector in the second modified version;

FIG. 40 is a diagram showing typical pixel-data patterns each included in an observed sub-block as a pattern to be compared with a typical pixel-data pattern in a corresponding reference sub-block in a process to compute a total evaluation value for another position vector in the second modified version;

FIG. 41 is a diagram showing typical pixel-data patterns each included in an observed sub-block as a pattern to be compared with a typical pixel-data pattern in a corresponding reference sub-block in a process to compute a total evaluation value for a further position vector in the second modified version;

FIG. 42 is a diagram showing typical pixel-data patterns each included in an observed sub-block as a pattern to be compared with a typical pixel-data pattern in a corresponding reference sub-block in a process to compute a total evaluation value for a still further position vector in the second modified version;

FIG. 43 is a diagram showing typical pixel-data patterns each included in an observed sub-block as a pattern to be compared with a typical pixel-data pattern in a corresponding reference sub-block in a process to compute a total evaluation value for a still further position vector in the second modified version;

FIG. 46 is a diagram showing typical pixel-data patterns each included in an observed sub-block as a pattern to be compared with a typical pixel-data pattern in a corresponding reference sub-block obtained as a result of applying the second division technique to the second modified version in a process to compute a total evaluation value for a position vector;

FIG. 47 is a diagram showing typical pixel-data patterns each included in an observed sub-block as a pattern to be compared with a typical pixel-data pattern in a corresponding reference sub-block obtained as a result of applying the second division technique to the second modified version in a process to compute a total evaluation value for another position vector;

FIG. 48 is a diagram showing typical pixel-data patterns each included in an observed sub-block as a pattern to be compared with a typical pixel-data pattern in a corresponding reference sub-block obtained as a result of applying the second division technique to the second modified version in a process to compute a total evaluation value for a further position vector;

FIG. 53A is an explanatory diagram to be referred to in describing a third area division technique to divide a search range on the position-vector plane in a third modified version of the embodiment as a technique other than the first and second area division techniques whereas FIG. 53B is an explanatory diagram to be referred to describing a fourth area division technique to divide a search range on the position-vector plane in the third modified version as a technique other than the first and second area division techniques;

FIG. 54 is a diagram to be referred to in description of a process to search 13 position vectors of a search sub-area obtained as a result of applying the first area division technique;

FIG. 55A is a diagram showing a typical case in which a search process Sa is again carried out after a search process Sa is carried out on a search sub-area obtained as a result of applying the first area division technique; FIG. 55B is a diagram showing a typical case in which a search process Sc is carried out after a search process Sa is carried out on a search sub-area obtained as a result of applying the first area division technique; FIG. 55C is a diagram showing another typical case in which a search process Sd is carried out after a search process Sa is carried out on a search sub-area obtained as a result of applying the first area division technique; and FIG. 55D is a diagram showing a typical case in which a search process Sb is carried out as a simple search process after a search process Sa is carried out on a search sub-area obtained as a result of applying the first area division technique;

FIG. 56A is a diagram showing a typical case in which a search process Sb is again carried out after a search process Sb is carried out on a search sub-area obtained as a result of applying the second area division technique; FIG. 56B is a diagram showing a typical case in which a search process Sd is carried out after a search process Sb is carried out on a search sub-area obtained as a result of applying the second area division technique; FIG. 56C is a diagram showing another typical case in which a search process Sc is carried out after a search process Sb is carried out on a search sub-area obtained as a result of applying the second area division technique; and FIG. 56D is a diagram showing a typical case in which a search process Sa is carried out as a simple search process after a search process Sb is carried out on a search sub-area obtained as a result of applying the second area division technique;

FIG. 57A is a diagram showing a typical case in which a search process Sc is again carried out after a search process Sc is carried out on a search sub-area obtained as a result of applying the third area division technique; FIG. 57B is a diagram showing a typical case in which a search process Sa is carried out after a search process Sc is carried out on a search sub-area obtained as a result of applying the third area division technique; FIG. 57C is a diagram showing another typical case in which a search process Sb is carried out after a search process Sc is carried out on a search sub-area obtained as a result of applying the third area division technique; and FIG. 57D is a diagram showing a typical case in which a search process Sd is carried out as a simple search process after a search process Sc is carried out on a search sub-area obtained as a result of applying the third area division technique;

FIG. 58A is a diagram showing a typical case in which a search process Sd is again carried out after a search process Sd is carried out on a search sub-area obtained as a result of applying the fourth area division technique; FIG. 58B is a diagram showing a typical case in which a search process Sb is carried out after a search process Sd is carried out on a search sub-area obtained as a result of applying the fourth area division technique; FIG. 58C is a diagram showing another typical case in which a search process Sa is carried out after a search process Sd is carried out on a search sub-area obtained as a result of applying the fourth area division technique; and FIG. 58D is a diagram showing a typical case in which a search process Sc is carried out as a simple search process after a search process Sd is carried out on a search sub-area obtained as a result of applying the fourth area division technique;

DETAILED DESCRIPTION

Figure 3:
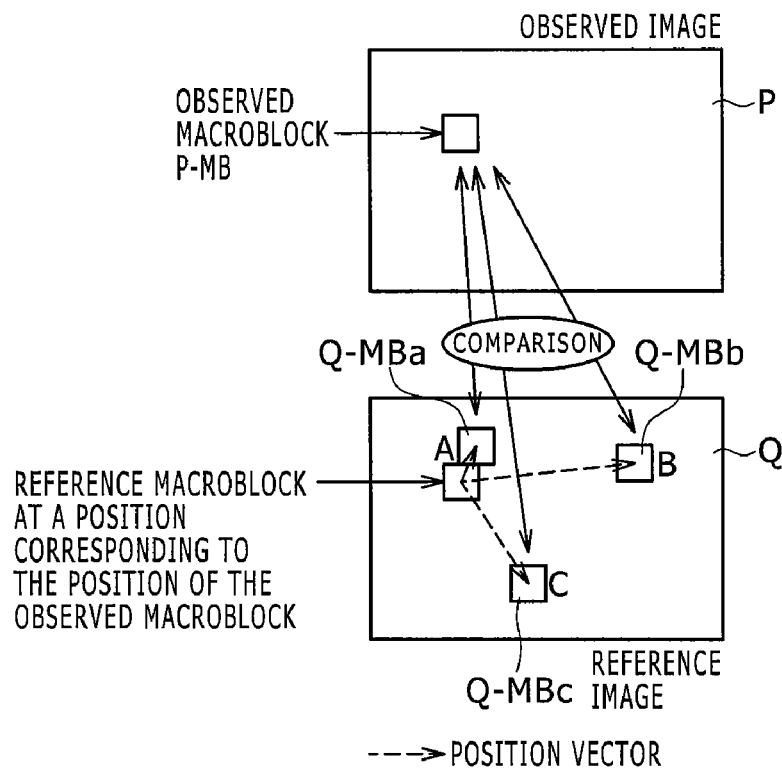
FIG. 3 is an explanatory diagram to be referred to in description of a process to compare a macroblock of an observed image P with a macroblock of a reference image Q.

FIG. 1 is a block diagram showing a typical configuration of a moving-picture compression apparatus according to an embodiment.

A motion detection unit 12 included in the configuration shown in FIG. 1 compares an observed image received through an input terminal 11 with a reference image stored in a frame memory 10 at a high speed in order to generate a motion vector, and supplies the motion vector to a motion compensation unit 13. The motion compensation unit 13 subtracts a reference image pointed to by the motion vector from the observed image to get a difference, and supplies the difference to a DCT (Discrete Cosine Transform)/quantization unit 14. The DCT/quantization unit 14 carries out a discrete cosine transform/quantization process on the difference, and supplies the result of the discrete cosine transform/quantization process to an RL (Run Length)/VLC (Variable Length) coding unit 15. The DCT/quantization unit 14 also carries out an inverse quantization/inverse discrete cosine transform process on the result of the discrete cosine transform/quantization process to get back the difference, and supplies the difference back to the motion compensation unit 13. The motion compensation unit 13 adds the difference received from the DCT/quantization unit 14 to the reference image subtracted from the observed image to get back the observed image, and stores the observed image in a memory for an observed image. In the mean time, the RL/VLC coding unit 15 carries out an RL (Run Length)/VLC (Variable Length) coding process on a result received from the DCT/quantization unit 14 as the result of the discrete cosine transform/quantization process, and supplies the result of the RL (Run Length)/VLC (Variable Length) coding process to an output terminal 16.

In addition, the process to detect a motion vector in accordance with the embodiment can also be applied to a hand-trembling compensation apparatus shown in FIG. 2. In the case of the hand-trembling compensation apparatus shown in FIG. 2, an observed image received from an input terminal 11 is supplied to a motion detection unit 12, which then generates a motion vector in the same way as the moving-picture compression apparatus described above, and supplies the motion vector to a hand-trembling compensation unit 17. The hand-trembling compensation unit 17 makes use of the motion vector to infer a hand-trembling vector of the entire screen and carries out a hand-trembling compensation process based on information on the hand-trembling vector. Then, the hand-trembling compensation unit 17 outputs the result of the hand-trembling compensation apparatus shown in FIG. 2 to an output terminal 18.

The process to detect a movement or search for a movement is carried out by the motion detection unit 12 employed in the moving-picture compression apparatus or the hand-trembling compensation apparatus described above by comparing an observed image, whose movement is to be detected, with a reference image separated away from the observed image along the time axis by a small time difference.

To put it in detail, first of all, an observed image P is divided into a plurality of observed macroblocks P-MB each having a proper size such as 16×16 pixels for example. By the same token, each reference image Q is divided into a plurality of reference macroblocks Q-MBa, Q-MBb, Q-MBc and so on each having the same size of the observed macroblock P-MB. Then, as shown in FIG. 3, a selected macroblock P-MB is compared with each of some or all of the reference macroblocks Q-MBa, Q-MBb, Q-MBc and so on in order to determine which of the reference macroblocks Q-MBa, Q-MBb, Q-MBc and so on is similar to the selected macroblock P-MB. As a value representing similarity between two macroblocks P-MB and Q-MB, an evaluation value also referred to hereafter as a total evaluation value is found. Generally known typical evaluation values include an SAD (Sum of Absolute Differences) value or a SSD (Sum of Squared Differences) value. The differences are each a difference in value between any specific block element included in the macroblock P-MB and a block element included in the Q-MB as a block element at a position corresponding to the position of the specific block element included in the macroblock P-MB. The smallest SAD or SSD value among values found for the reference macroblocks Q-MBa, Q-MBb, Q-MBc and so on represents the highest degree of similarity between the macroblock P-MB and a reference macroblock Q-MB for which the smallest SAD or SSD value is found.

By the way, the reference macroblocks Q-MBa, Q-MBb, Q-MBc can be represented by position vectors Va, Vb, Vc and so on respectively as shown in FIG. 3. As shown in the figure, a position vector associated with a reference macroblock P-MB represents the length and direction of the distance between a position existing on the reference image Q as a position corresponding to the position of the selected observed macroblock P-MB on the observed image P and the position of the selected observed macroblock P-MB. The motion vector is defined as a position vector representing a reference macroblock Q-MB for which the smallest SAD or SSD value is found.

Figure 4:
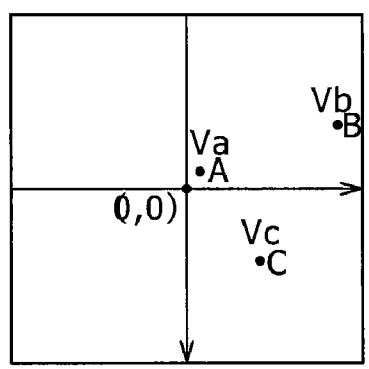
FIG. 4 is a diagram showing points existing on a position-vector plane on a reference image as points each pointed to by a position vector.

The position vectors Va, Vb, Vc and so on can be represented by points A, B, C and so on existing on a position-vector plane shown in FIG. 4. The points A, B, C and so on are the center points of the reference macroblocks Q-MBa, Q-MBb, Q-MBc represented by position vectors Va, Vb, Vc and so on respectively. In this case, the position existing on the reference image Q as a position corresponding to the position of the selected observed macroblock P-MB on the observed image P corresponds to the origin (0, 0) of the position-vector plane.

In this embodiment, as described above, the observed image whose movement is to be detected is divided into a plurality of observed macroblocks each having a typical size of 16×16 pixels and, by the same token, the reference image separated away from the observed image P along the time axis by a small time difference is also divided into reference macroblocks each having the same size of the observed macroblock. In addition, an area including a specific reference macroblock at a position corresponding to the position of a selected observed macroblock and reference macroblocks in the vicinity of the specific reference macroblock is taken as a search area. The reference macroblocks in the vicinity of the specific reference macroblock are typically eight reference macroblocks surrounding the specific reference macroblock. To put it in detail, FIG. 5A is a diagram showing the selected observed macroblock P-MB whereas FIG. 5B is a diagram showing the search area. As shown in FIG. 5B, the search area on the reference image Q includes the specific reference macroblock Q-MB0 at a position corresponding to the position of the selected observed macroblock P-MB on the observed image P and eight reference macroblocks Q-MB in the vicinity of the specific reference macroblock Q-MB0. Thus, the search area consists of a total of nine vicinity reference macroblocks Q-MB. The search area is an area to be searched for a motion vector. Since the height and width of the search area are each equal to the size of three reference macroblocks Q-MP and the size of each reference macroblock Q-MP is 16 pixels, the search area has dimensions of 48×48 pixels. The search area corresponds to an area existing on the position-vector plane shown in FIG. 4 as an area with a horizontal and vertical dimensions each having a length stretched from −16 pixels to 16 pixels.

In this embodiment, each macroblock is divided into a plurality of 16 (=4×4) sub-blocks each having a size of 4×4 pixels as shown in FIG. 5A. The search area on the reference image having a size of 48×48 pixels is also divided into sub-blocks each having a size of 4×4 pixels as shown in FIG. 5B. However, the search area is not divided into sub-blocks by simply dividing each of the 16 macroblocks into sub-blocks. Instead, an offset of 2 pixels is set at each of the vertical and horizontal sides of the search area. Then, an inner area enclosed by the offsets is divided into a plurality of sub-blocks. The offsets are also divided into a plurality of sub-blocks, which may have different sizes such as 2×2, 2×4 and 4×2 pixels. That is to say, the sub-blocks each having the size of 2×2 pixels are located at the corners of the search area, the sub-blocks each having the size of 4×2 or 2×4 pixels are located on the sides and the remaining sub-blocks in the inner area each have a size of 4×4 pixels.

It is to be noted that the numerical values given in this embodiment are no more than typical values. For example, the sizes of the macroblock used as a unit in the process to detect a motion vector, the search area and the sub-block are by no means limited to 16×16, 48×48 and 4×4 pixels respectively, but can be set at any other arbitrary values. In addition, the width of the aforementioned offset set in dividing the search area is by no means limited to two pixels, but can be set at any other arbitrary value.

The observed and reference images are each stored in a memory in sub-block units. That is to say, an operation to read out an image from the memory, a sub-block of 16 (=4×4) pixels is retrieved. FIG. 6 is a circuit block diagram showing a memory 10*a* for storing an observed image, a memory 10*b* for storing a reference image and a unit 12*c* for detecting/computing a motion vector. In the circuits shown in FIG. 6, the motion-vector detection/computation unit 12*c* reads out the observed and reference images from the observed-image memory 10*a* and the reference-image memory 10*b* respectively, detects a movement on the basis of the images and outputs a motion vector as a result of the process to detect a movement.

In the embodiment with the search area existing on the reference image as a range having a size of 48×48 pixels and the macroblocks each having a size of 16×16 pixels, an area stretched over a height of −16 pixels to 16 pixels in the vertical direction and a width of −16 pixels to 16 pixels in the horizontal is searched in macroblock units for a motion vector. On a position-vector plane shown in FIG. 7A, the search area is a range centered at the origin (0, 0) and having a height stretched in the vertical direction from −16 pixels to 16 pixels and a width stretched in horizontal direction from a coordinate of −16 to a coordinate of 16.

The motion-vector detection/computation unit 12c shown in FIG. 6 reads out observed sub-blocks each used as a processing unit of the observed image from the observed-image memory 10a. By the same token, the motion-vector detection/computation unit 12c reads out reference sub-blocks each used as a processing unit of the reference image from the reference-image memory 10b. For this reason, in the following description, an observed sub-block and a reference sub-block are also referred to as an observed processing block and a reference processing block respectively. Then, partial evaluation values representing relations between a plurality of observed sub-blocks of a selected observed macroblock and reference sub-blocks each corresponding to one of the observed sub-blocks are computed concurrently for a reference macroblock including the reference sub-blocks. The process to compute such partial evaluation values is carried out for each of a plurality of reference macroblocks included in the search area as reference macroblocks each represented by a position vector. Subsequently, the partial evaluation values representing relations between the observed sub-blocks of the selected observed macroblock and reference sub-blocks composing a reference macroblock represented by a position vector are summed up to result in a total evaluation value for the position vector. Finally, the total evaluation values each found for a position vector are compared with each other to determine an optimum total evaluation value found for a position vector, which is referred to as a motion vector for the selected observed macroblock.

In actuality, the processing to search for a motion vector in accordance with the embodiment is approximately carried out at three steps, i.e., a coarse-grain search process, a detailed search process (or an accurate search process) and a half-pixel search process (or a more accurate search process). The accurate search process is a process to search an optimum motion vector by taking the pixel unit as the processing unit. The coarse-grain search process is a process to search a motion vector by taking the macroblock unit as the processing unit. The half-pixel search process is a process to search a final motion vector by taking half a pixel or a granularity finer than half a pixel as the processing unit. An example of the granularity finer than half a pixel is one-fourth of a pixel.

Figure 7A:
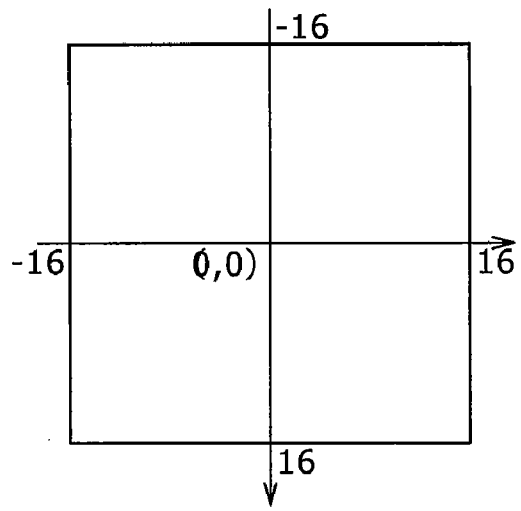
FIG. 7A is a diagram showing a search range on the position-vector plane whereas FIG. 7B a diagram showing a plurality of search sub-ranges obtained by dividing the search range.
Figure 7B:
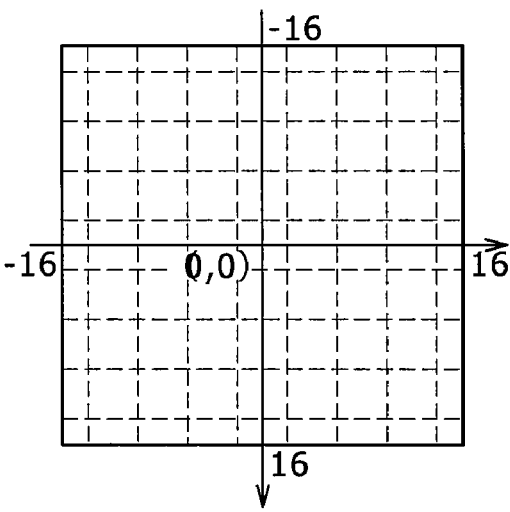

The coarse-grain search process is explained as follows. First of all, the search area placed on the position-vector plane as a range centered at the origin (0, 0) and having a height stretched in the vertical direction from a coordinate of −16 to a coordinate of 16 and a width stretched in horizontal direction from coordinate of −16 to a coordinate of 16 as shown in FIG. 7A is divided into a plurality of smaller search sub-areas shown in FIG. 7B. In this embodiment, the search area is divided into search sub-areas each having a size of 5×5 sub-blocks.

The coarse-grain search process is not carried out to detect the final movement process. Instead, every search sub-area is associated with a plurality of position vectors and a total evaluation value is found for each of the position vectors. Then, the total evaluation values are compared with each other in order to determine a search sub-area pointed to by a position vector defined as a motion vector. After the search sub-area pointed to by a motion vector is determined, a detailed search process and a half-pixel search process are carried out. The detailed search process and the half-pixel search process will be described later in detail.

Figure 8A:
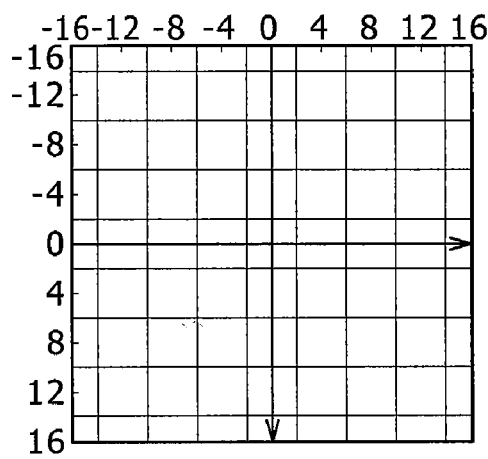
Figure 8B:
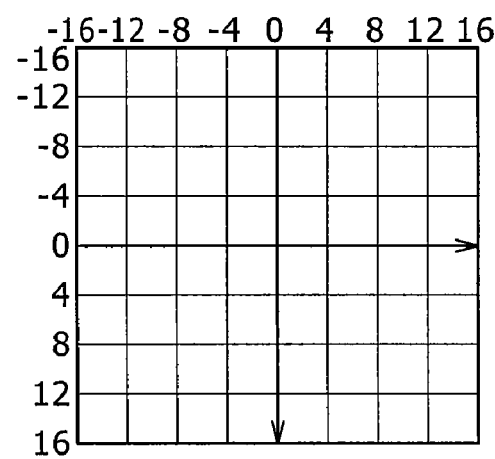
FIG. 8B is an explanatory diagram to be referred to in description of a second area division technique to divide a search range on the position-vector plane.

Typical processes to divide the search area into a plurality of smaller search sub-areas are explained by referring to FIGS. 8A and 8B. The search area can be divided into a plurality of smaller search sub-areas in accordance with a first area division technique shown in FIG. 8A or a second area division technique shown in FIG. 8B. FIG. 8A is a diagram showing the same search sub-areas as those shown in FIG. 7B. As described above, every search sub-area is associated with a plurality of position vectors and a total evaluation value is found for each of the position vectors.

Figures 9A, 9B:
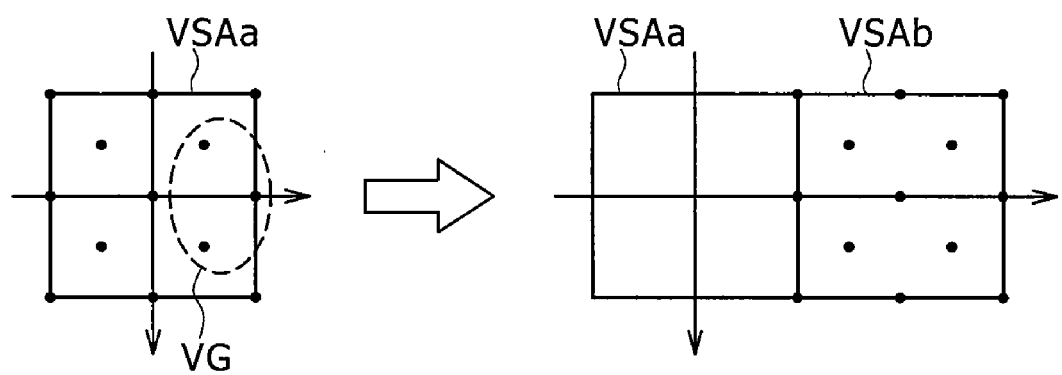

That is to say, first of all, a certain search sub-area is taken as the initial search sub-area and a total evaluation value is found for each of position vectors associated with the initial search sub-area. As a result, distribution of total evaluation values found for the position vectors associated with the initial search sub-area becomes obvious. In accordance with the distribution, a next search sub-area on which the motion-vector search process is to be carried out next is determined. Let us assume for example that, for the initial search sub-area VSAa on the position-vector plane shown in FIG. 9A, total evaluation values computed for a position-vector group VG on the right side of the initial search sub-area VSAa are small values each representing a high degree of similarity to the selected observed macroblock. In this case, it is quite within the bounds of possibility that a search sub-area VSAb adjacent to the right side of the search sub-area VSAa is associated with position vectors for which even smaller total evaluation values will be found. Thus, the search sub-area is changed from the search sub-area VSAa to the search sub-area VSAb shown in FIG. 9B as a search sub-area adjacent to the right side of the search sub-area VSAa. Then, a total evaluation value is found for each of position vectors associated with the search sub-area VSAb in the same way as the search sub-area VSAa. It is to be noted that a next search sub-area on which the motion-vector search process is to be carried out next is by no means limited to search sub-areas adjacent to the present search sub-area. For example, a search sub-area can be selected as a next search sub-area among those overlapping the present search sub-area. The process to find a total evaluation value for each of position vectors associated with the present search sub-area and the process determine a next search sub-area are carried out repeatedly by changing the present search sub-area to the next one till the minimum total evaluation value is eventually detected. A position vector for which the minimum total evaluation value has been found is taken as the motion vector for the selected observed macroblock.

If a method for computing total evaluation values in a search sub-area obtained as a result of applying the first area division technique shown in FIG. 8A is adopted as a method different from a method adopted for computing total evaluation values in a search sub-area obtained as a result of applying the second area division technique shown in FIG. 8B, the processing can be carried out at a high speed. The different methods for computing total evaluation values are explained as follows.

Figure 10:
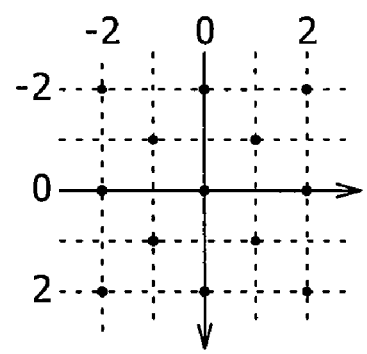
FIG. 10 is a diagram showing a typical search sub-area existing on the position-vector plane as a search sub-area obtained as a result of adopting the first area division technique and a typical group of position vectors each associated with the typical search sub-area as a vector for which a total evaluation value is computed.
Figure 11:
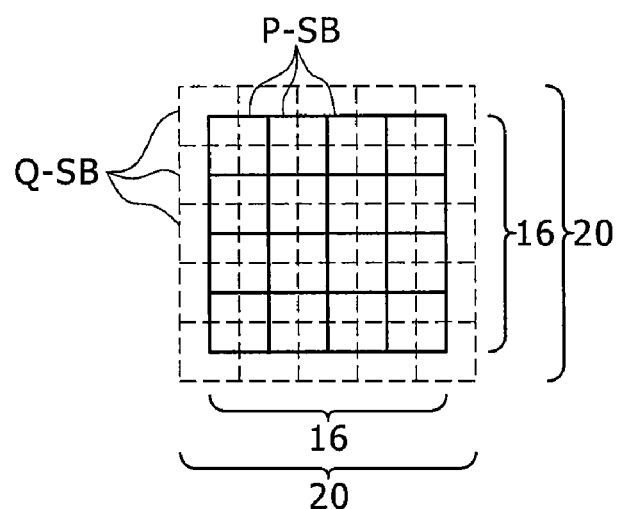
FIG. 11 is a diagram showing a relation between the position of a search sub-area obtained as a result of adopting the first area division technique and the position of an observed macroblock.

FIG. 10 is a diagram showing a typical search sub-area existing on the position-vector plane as a search sub-area obtained as a result of adopting the first area division technique shown in FIG. 8A and a typical group of position vectors each associated with the typical search sub-area as a vector for which a total evaluation value is computed. Each of the position vectors indicates another search sub-area to be selected as a sub-area to be subjected to a search process next. As shown in FIG. 10, the search sub-area is an area stretched in the vertical direction from a horizontal side at a coordinate of −2 to a horizontal side at a coordinate of +2 and in the horizontal direction from a vertical side at a coordinate of −2 to a vertical side at a coordinate of +2. Thus, associated with a 16×16 observed macroblock, the search sub-area obtained as a result of adopting the first area division technique has a size of 20×20 as shown in FIG. 11. FIG. 11 is a diagram showing a relation between the position of the search sub-area illustrated by making use of dashed lines and the position of the observed macroblock illustrated by making use of solid lines. As shown in FIG. 11, each specific one of observed sub-blocks P-SB included in the observed macroblock is shifted in the vertical and horizontal directions by a shift distance equivalent to two pixels or half the sub-block from a reference sub-block Q-SB included in the search sub-area as a reference sub-block corresponding to the specific observed sub-block P-SB. The observed sub-blocks P-SB and the reference sub-blocks Q-SB are stored in a memory. Let us assume for example that the center point of the search sub-area coincides with the origin (0, 0). In this case, 25 (=5×5) reference sub-blocks are included in the search sub-area shown in FIG. 11.

Figure 12A:
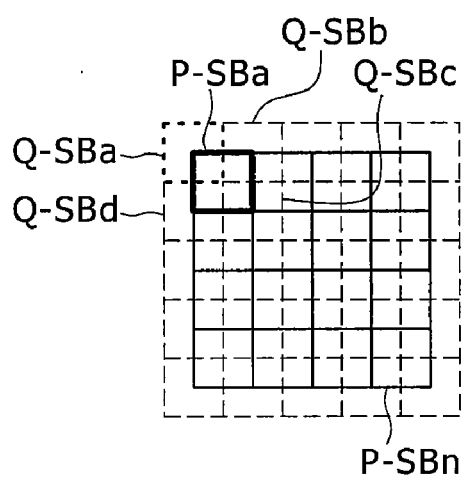
Figure 12B:
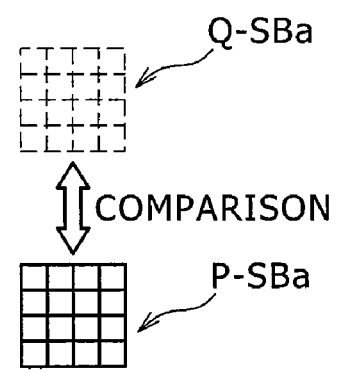
FIG. 12B is a diagram showing a process to compare data of an observed sub-block with data of a reference sub-block.

The following description explains a typical method of concurrently finding total evaluation values for a plurality of position vectors associated with the search sub-area. In FIGS. 12 to 16, observed sub-blocks included in an observed macroblock are illustrated by making use of solid lines while reference sub-blocks included in a search sub-area are illustrated by making use of dashed lines. First of all, an observed sub-block P-SBa located at the upper-left corner of the observed macroblock as shown in FIG. 12A and a reference sub-block Q-SBa located on the upper-left side of the observed sub-block P-SBa as shown in the same figure are read out from the memory at the same time. Then, a partial evaluation value representing a relation between the observed sub-block P-SBa and the reference sub-block Q-SBa is found by comparing some pieces of data of the observed sub-block P-SBa with pieces of data of the reference sub-block Q-SBa as shown in FIG. 12B. The pieces of data in the observed sub-block P-SBa to be compared are selected from the pieces of data of 16 pixels included in the observed sub-block P-SBa. By the same token, the pieces of data in the reference sub-block Q-SBa to be compared are selected from the pieces of data of 16 pixels included in the reference sub-block Q-SBa.

Figure 13:
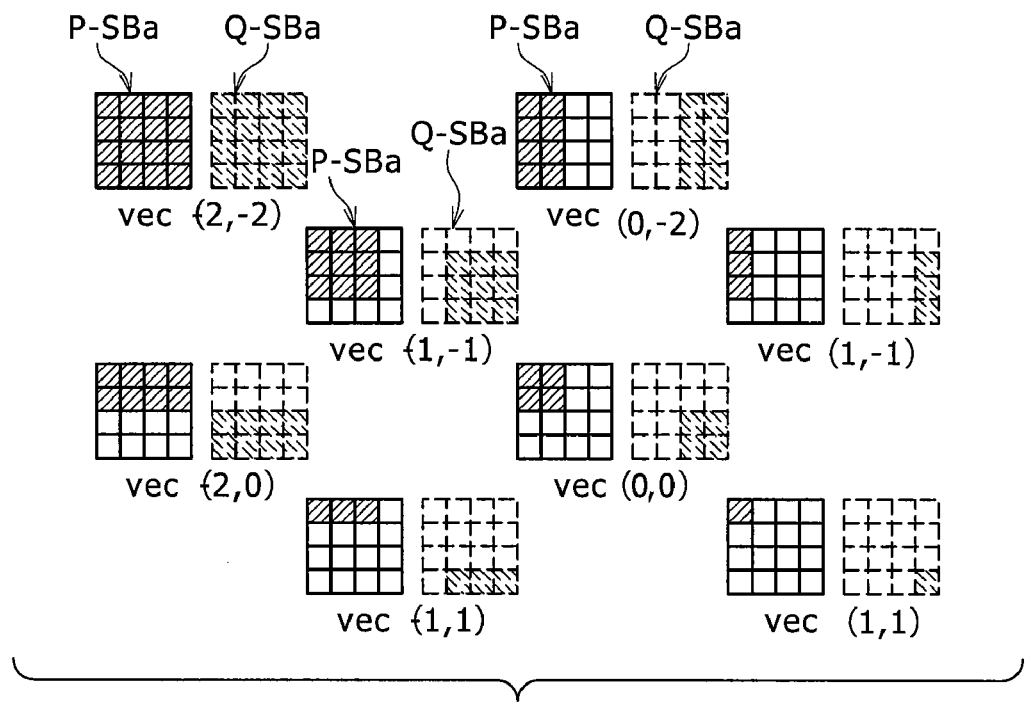
FIG. 13 is a diagram showing typical pixel-data patterns each included in an observed sub-block as a pattern to be compared with a typical pixel-data pattern in a corresponding reference sub-block in a process to compute a total evaluation value for a position vector.

To put it concretely, a partial evaluation value representing a relation between the observed sub-block P-SBa and the reference sub-block Q-SBa is found by comparing some pieces of data of pixels in the observed sub-block P-SBa with pieces of data of pixels in the reference sub-block Q-SBa for some data patterns each shown in FIG. 13 as a data pattern of the observed sub-block P-SBa and the reference sub-block Q-SBa. To be more specific, some pieces of data of pixels hatched by slanting lines in the observed sub-block P-SBa as shown in FIG. 13 are compared with pieces of data of pixels hatched by slanting lines in the reference sub-block Q-SBa as shown in the same figure in order to compute a partial evaluation value representing a relation between the observed sub-block P-SBa and the reference sub-block Q-SBa. Each pair of data patterns is set in such a way that the data pattern pair corresponds to a position vector vec (i, j) of the position-vector group shown in FIG. 10. A position vector (i, j) shown in FIG. 13 is a vector with the subscript i denoting the horizontal-direction (x-direction) component and the subscript j denoting the vertical-direction (y-direction) component. That is to say, a pair of data patterns and a position vector vec (i, j) associated with the data pattern pair indicate that partial evaluation values are computed by comparison of pieces of data in the data patterns with each other for the position vector vec (i, j). The interpretation of a pair of data patterns and a position vector vec (i, j) associated with the data pattern pair holds true of FIG. 14 and subsequent figures. The partial evaluation values are computed concurrently by comparing a plurality of pixels in the data patterns with each other for each of a plurality of position vectors vec (i, j). The process for computing partial evaluation values is carried out for each of observed sub-blocks composing an observed macroblock shown in FIG. 12 by selection of an observed sub-block typically in the raster scan order, starting with the observed sub-block P-SBa located at the upper-left corner of the observed macroblock and ending with the observed sub-block P-SBn located at the lower-right corner of the observed macroblock. Since the observed macroblock consists of 16 observed sub-blocks P-SBa to P-SBn, processing for the observed macroblock is completed in 16 cycles.

Figure 14:
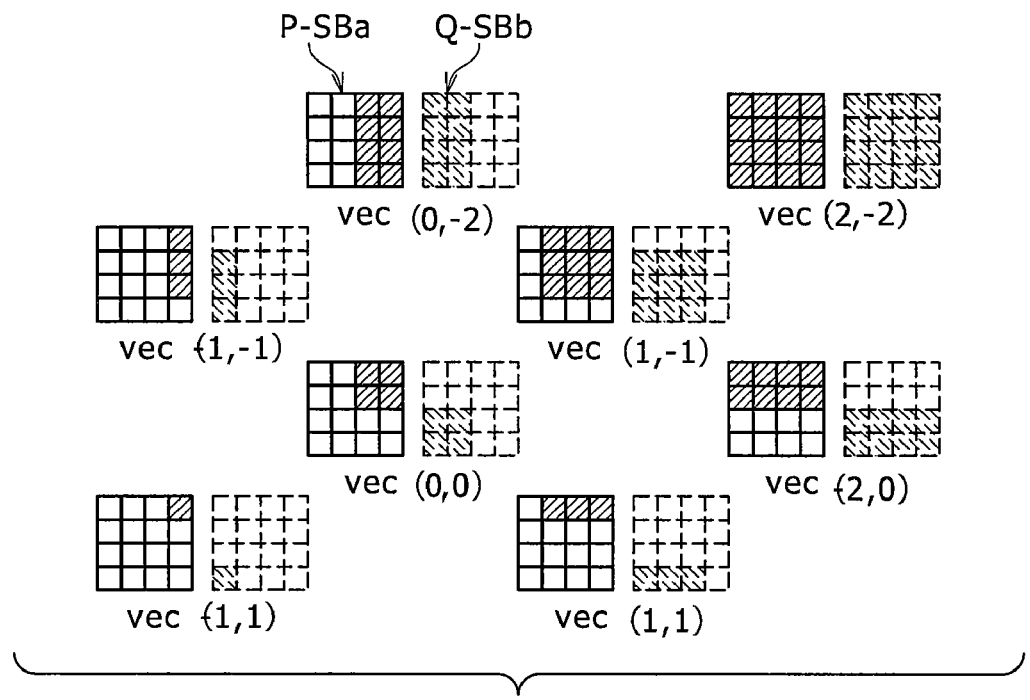
FIG. 14 is a diagram showing typical pixel-data patterns each included in an observed sub-block as a pattern to be compared with a typical pixel-data pattern in another corresponding reference sub-block in a process to compute a total evaluation value for a position vector.

Next, the observed sub-block P-SBa and a reference sub-block Q-SBb located on the upper-right side of the observed sub-block P-SBa as shown in FIG. 12A are read out from the memory at the same time. Then, a partial evaluation value representing a relation between the observed sub-block P-SBa and the reference sub-block Q-SBb is found by comparing some pieces of data of the observed sub-block P-SBa with pieces of data of the reference sub-block Q-SBb. The pieces of data in the observed sub-block P-SBa to be compared are selected from the pieces of data of 16 pixels included of the observed sub-block P-SBa. By the same token, the pieces of data in the reference sub-block Q-SBb to be compared are selected from the pieces of data of 16 pixels included of the reference sub-block Q-SBb. In this case, however, pixel-data patterns shown in FIG. 14 are used. Then, in the same way as the reference sub-block Q-SBa, processing is carried out for all the observed sub-blocks P-SBa to P-SBn.

Figure 15:
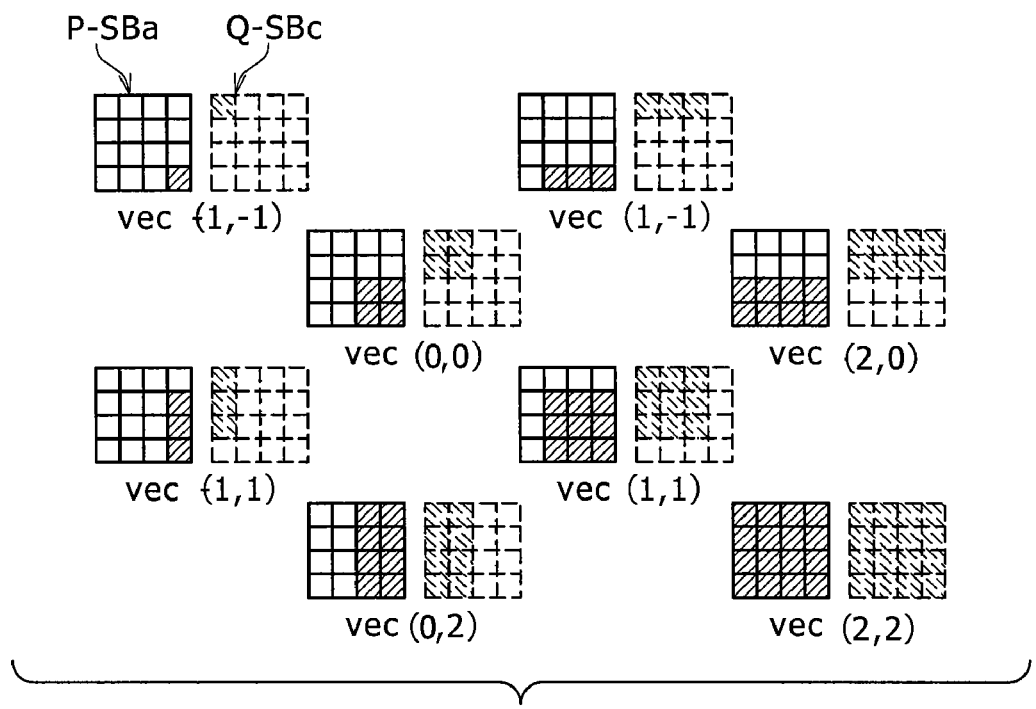
FIG. 15 is a diagram showing typical pixel-data patterns each included in an observed sub-block as a pattern to be compared with a typical pixel-data pattern in a further corresponding reference sub-block in a process to compute a total evaluation value for a position vector.

Next, the observed sub-block P-SBa and a reference sub-block Q-SBc located on the lower-right side of the observed sub-block P-SBa as shown in FIG. 12A are subjected to the same process as the reference sub-block Q-SBa. In this case, however, pixel-data patterns shown in FIG. 15 are used. Finally, the observed sub-block P-SBa and a reference sub-block Q-SBd located on the lower-left side of the observed sub-block P-SBa as shown in FIG. 12A are subjected to the same process as the reference sub-block Q-SBa. In this case, however, pixel-data patterns shown in FIG. 16 are used.

By carrying out the processing described above, partial evaluation values for every position vector in the search sub-area are computed. Since the processing consisting of 16 cycles is carried out four times for the reference sub-blocks Q-SBa, Q-SBb, Q-SBc and Q-SBd respectively, the whole processing is completed in 64 cycles.

Figure 16:
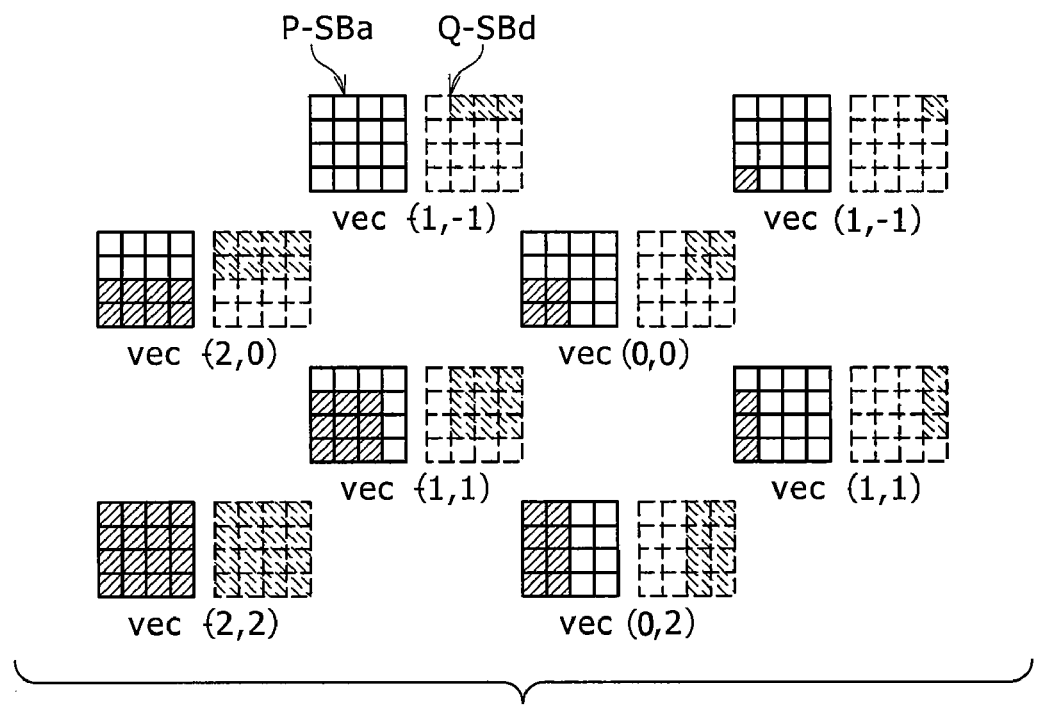
FIG. 16 is a diagram showing typical pixel-data patterns each included in an observed sub-block as a pattern to be compared with a typical pixel-data pattern in a still further corresponding reference sub-block in a process to compute a total evaluation value for a position vector.

FIGS. 13 to 16 are each a diagram showing pixel-data patterns, which are each a combination of pixels, for the observed sub-block and the four reference sub-blocks. The pixel-data patterns are related to each other at the following point. If each of the pixel-data patterns shown in FIGS. 14, 15 and 16 is rotated in the counterclockwise direction by 90 degrees, the pixel-data patterns shown in FIGS. 13, 14 and 15 respectively will be obtained. That is to say, if each of the pixel-data patterns shown in FIG. 14 is rotated in the counterclockwise direction by 90 degrees, if each of the pixel-data patterns shown in FIG. 15 is rotated in the counterclockwise direction by 180 degrees or if each of the pixel-data patterns shown in FIG. 16 is rotated in the counterclockwise direction by 270 degrees the pixel-data patterns shown in FIG. 13 will be obtained.

Thus, by making use of a pattern computation unit 20 as a unit configured to compute a pixel-data pattern as well as rotation processing units 23 and 24 as units each configured to rotate data of a sub-block by a multiple of 90 degrees as shown in FIG. 17, partial evaluation values can be found for four different sets of pixel-data patterns. That is to say, for example, an observed sub-block P-SB is supplied from an input terminal 21 to the pattern computation unit 20 by way of the rotation processing unit 23 whereas a reference sub-block Q-SB is supplied from an input terminal 22 to the pattern computation unit 20 by way of the rotation processing unit 24, and the pattern computation unit 20 computes partial evaluation values for all pixel-data patterns shown in FIG. 13, outputting the partial evaluation values to an output terminal 25.

Then, by making use of total evaluation values each computed for a specific one of the 13 position vectors like the ones shown in FIG. 10 from partial evaluation values found for the specific position vector, a search sub-area to be subjected to a search process next can be selected. For example, a search sub-area separated away from the present search sub-area in a direction indicated by a position vector having a smallest total evaluation value is selected as a search sub-area to be subjected to a search process next. In the following description, the position vector having a smallest total evaluation value is also referred to as an optimum position vector or a motion vector.

Next, a search sub-area obtained as a result of adopting the second area division technique shown in FIG. 8B is explained. FIG. 18 is a diagram showing a typical search sub-area existing on the position-vector plane as a search sub-area obtained as a result of adopting the second area division technique shown in FIG. 8B and a typical group of position vectors each associated with the typical search sub-area as a vector for which a total evaluation value is computed. As shown in FIG. 18, the search sub-area is an area stretched in the vertical direction from a horizontal side at −2 to a horizontal side +2 and in the horizontal direction from a vertical side at −2 to a vertical side at +2. Thus, associated with an 16×16 observed macroblock, the search sub-area obtained as a result of adopting the second area division technique has a size of 20×20 as shown in FIG. 19.

FIG. 19 is a diagram showing a relation between the position of the search sub-area and the position of the observed macroblock. As shown in FIG. 19, in a range H included in the search sub-area as a range to be subjected to a search process, each specific one of observed sub-blocks P-SB included in the observed macroblock coincides with a reference sub-block Q-SB included in the search sub-area as a reference sub-block corresponding to the specific observed sub-block P-SB.

For each of the position vectors shown in FIG. 18, partial evaluation values are computed also only for some pixels included in each of observed and reference macroblocks. In general, a partial evaluation value is computed for each pixel included in a macroblock of an observed image and a corresponding pixel included in a macroblock of a reference image and, then, a total evaluation value is found as a sum of partial evaluation values computed for all pixels included in the macroblock of the observed image and corresponding pixels included in the macroblock of the reference image. In this case, however, partial evaluation values are computed for only some pixels included in the macroblock of the observed image and some corresponding pixels included in the macroblock of the reference image. One of the reasons is that by computing partial evaluation values for only some pixels included in the macroblock of the observed image and some corresponding pixels included in the macroblock of the reference image, the amount of processing can be reduced and the processing can be completed in a shorter period of time. Another reason is that, if the role is also played by the computation adopting the second division technique to obtain an approximate directivity while the first area division technique shown in FIG. 8A is being executed, computation to be carried out with a high degree of precision is not required. It is to be noted that, in order to obtain perfect evaluation values, it will undesirably take time longer than the time required by the first area division technique. This is because, in the case of the first area division technique, processing for one observed sub block P-SBa can be completed in only four cycles corresponding to the four reference sub-blocks Q-SBa, Q-SBb, Q-SBc and Q-SBd respectively but, in the case of the second area division technique, processing for one observed sub block P-SBa can be completed in only nine cycles for respectively the coinciding reference sub block and eight reference sub blocks surrounding the coinciding reference sub block. Since a macroblock consists of 16 sub-blocks, it takes 144 (=9×16) cycles to complete processing for a macroblock. It is thus desirable to compute partial evaluation values only for some pixels included in a macroblock also in the case of the second area division technique.

The following description explains a point at which the second area division technique shown in FIG. 8B is used as a supplementary tool for giving aids in calculation of evaluation values to the first area division technique shown in FIG. 8A. Naturally, the first area division technique shown in FIG. 8A can be used to cover the entire search area shown in FIG. 5. That is to say, since the entire search area can be searched for a motion vector in every hole and corner, the second area division technique shown in FIG. 8B is not required. In order to reduce the amount of processing and the processing time, however, the embodiment adopts a method whereby, instead of searching the entire search area for a motion vector, the search process is commenced from a start spot existing in the search area, another spot existing in the vicinity of the start spot as a vicinity spot seeming to have smaller evaluation values than those of the start spot is found, the operations to compute evaluation values for the present spot and find a vicinity spot are carried out repeatedly till a spot considered to have optimum evaluation values is found. If this method is adopted in conjunction with only the first area division technique, it is impossible to search the search sub-area for a motion vector with a high degree of efficiency (or at a smaller amount of processing) if a next position vector points to a spot separated away from the present spot in an inclined direction as a vicinity spot with smaller evaluation values.

Figure 20D:
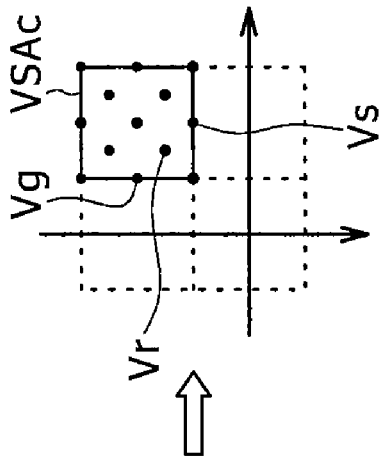
FIG. 20D is an explanatory diagram showing a next search sub-area selected after the search sub-area shown in FIG. 20C from search sub-areas obtained as a result of adoption of the first area division technique.
Figure 20B:
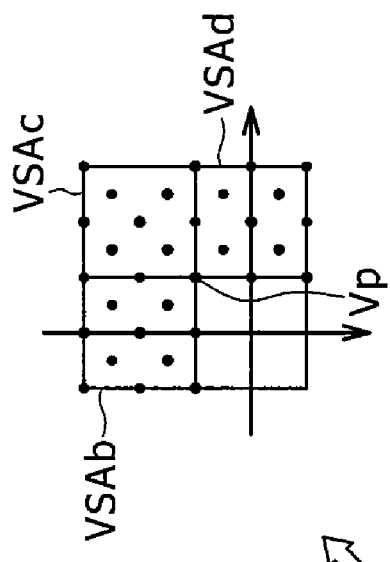
FIG. 20B is an explanatory diagram showing next search sub-areas selected after the initial search sub-area from search sub-areas obtained as a result of adoption of the first area division technique.
Figure 20C:
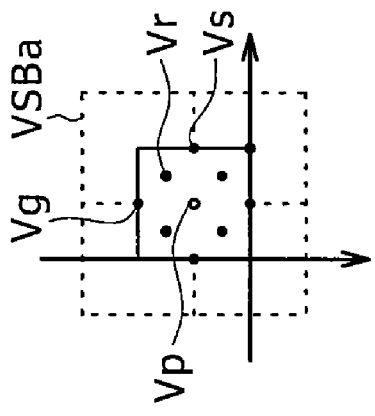
FIG. 20C is an explanatory diagram showing a next search sub-area selected after the initial search sub-area from search sub-areas obtained as a result of adoption of the second area division technique.
Figure 20A:
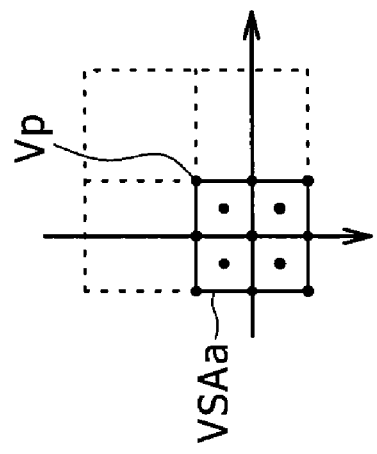
FIG. 20A is an explanatory diagram showing an initial search sub-area on the position-vector plane.

Let us assume for example that, a position vector Vp pointing to a dot at the upper-right corner of a search sub-area VSAa on the position-vector plane as an optimum vector for which a smallest total evaluation value has been found is detected in the search sub-area VSAa obtained by adoption of the first area division technique as shown in FIG. 20A. In this case, it is desirable to carry out the next motion-vector search process on search sub-areas centered at the dot pointed to by the position vector Vp. If only the first area division technique is adopted, three search sub-areas VSAb, VSAc and VSAd shown in FIG. 20B each need to be newly searched for an optimum position vector, the total evaluation value found for which is smallest among those found for other position vectors. By adopting this technique, adjacent search sub-areas pointed to by the position vector Vp can each be searched for an optimum position vector certainly with a very high degree of precision. However, the amount of processing increases considerably in an undesirable manner.

In order to solve the above problem, instead of searching the three adjacent search sub-areas VSAb, VSAc and VSAd, first of all, an area centered at the dot pointed to by the optimum position vector Vp detected in the first search process is taken as a search sub-area VSBa resulting from adoption of the second area division technique as shown in FIG. 20C and searched with ease for an optimum position vector. To put it in detail, a total evaluation value is computed for each of eight position vectors in the search sub-area VSBa and an optimum position vector with a minimum total evaluation value is detected from the eight position vectors as an optimum vector pointing to a next search sub-area on which the search process is to be carried out. Let us assume that, in the search sub-area VSBa shown in FIG. 20C, three optimum position vectors Vq, Vr and Vs on the upper-right side of the sub-area are detected as vectors, for which smallest total evaluation values have been found. In this case, a search sub-area VSAc resulting from adoption of the first area division technique as shown in FIG. 20d is searched next. By adopting this method of determining next search sub-areas, the amount of processing can be reduced without much lowering the degree of precision. Let us assume that the process to search a search sub-area resulting from adoption of the first area division technique is completed in 64 cycles while the process to search a search sub-area resulting from adoption of the second area division technique is completed in 16 cycles. In this case, the process to search the search sub-areas each shown in FIG. 20B as a range resulting from adoption of the first area division technique only is completed in 192 (=3×64) cycles while the process to search the search sub-areas shown in FIGS. 20C and 20D as ranges resulting from adoption of the first and second area division techniques is completed in only 80 (=16+64) cycles.

Figure 21:
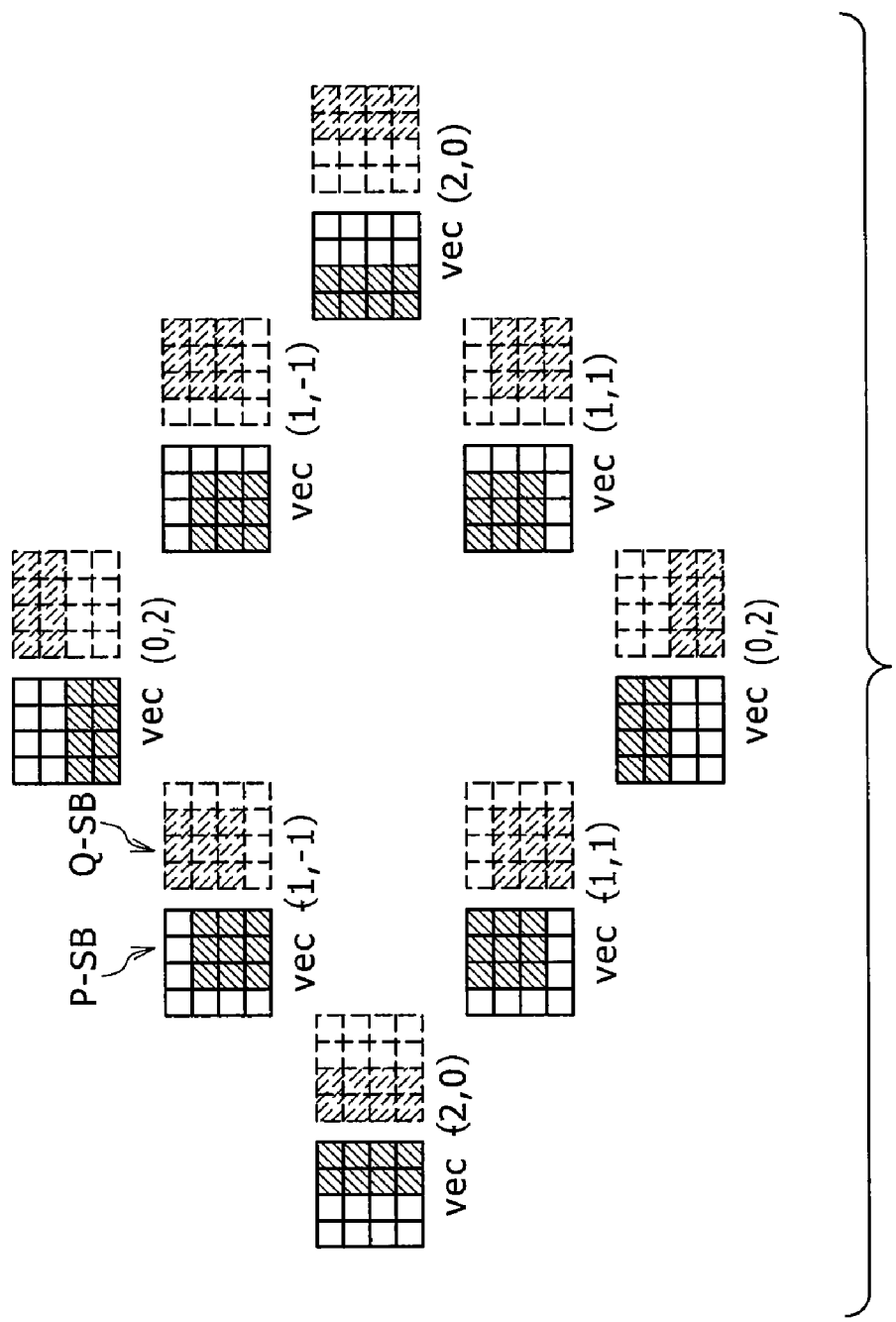
FIG. 21 is a diagram showing typical pixel-data patterns each included in an observed sub-block as a pattern to be compared with a typical pixel-data pattern in a corresponding reference sub-block in a process to compute a total evaluation value for a position vector.

Next, a method for computing evaluation values in conformity with the second area division technique is explained. First of all, an observed sub-block P-SB located at the upper-left corner of the observed macroblock as shown in FIG. 19 and a reference sub-block Q-SB located at a position corresponding to the position of the observed sub-block P-SBa as shown in the same figure are read out from the memory at the same time. Then, in the same way as the first area division technique described earlier, a partial evaluation value representing a relation between the observed sub-block P-SB and the reference sub-block Q-SB is found by comparing 16 pieces of data of pixels in the observed sub-block P-SB with 16 pieces of data of pixels in the reference sub-block Q-SB, that is, by comparing data of some pixel-data patterns each shown in FIG. 21 as a pixel-data pattern of the observed sub-block P-SB and the reference sub-block Q-SB. To be more specific, only eight pieces of data of pixels hatched by slanting lines in the observed sub-block P-SB as shown in FIG. 21 are compared with only eight pieces of data of pixels hatched by slanting lines in the reference sub-block Q-SB as shown in the same figure in order to compute a partial evaluation value representing a relation between the observed sub-block P-SBa and the reference sub-block Q-SBa. Each pair of pixel-data patterns is set in such a way that the pixel-data pattern pair corresponds to a position vector vec (i, j) of a position-vector group shown in FIG. 18. A position vector (i, j) shown in FIG. 21 is a vector with the subscript i denoting the horizontal-direction (x-direction) component and the subscript j denoting the vertical-direction (y-direction) component. That is to say, a pair of pixel-data patterns and a position vector vec (i, j) associated with the pixel-data pattern pair indicate that partial evaluation values are computed by comparison of pieces of data in the pixel-data patterns with each other for the position vector vec (i, j).

Figure 22A:
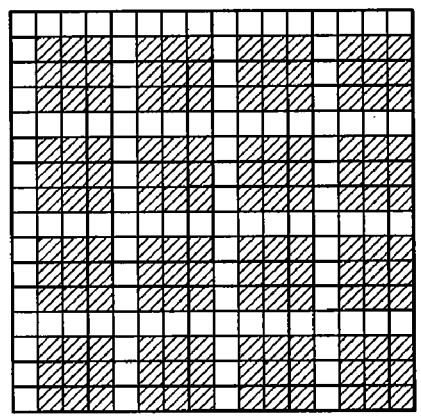
FIG. 22A is a diagram showing pixels used for computing evaluation values for a position vector in a search sub-area obtained as a result of adoption of the second area division technique.
Figure 22B:
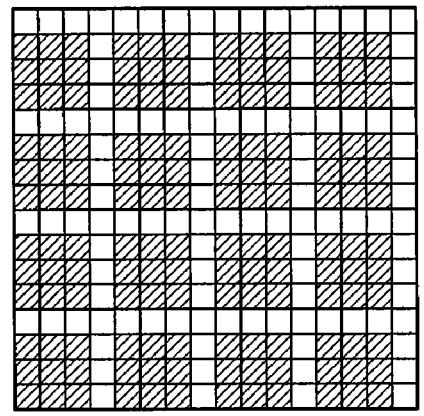
FIG. 22B is a diagram showing pixels used for computing evaluation values for another position vector in a search sub-area obtained as a result of adoption of the second area division technique.
Figure 22C:
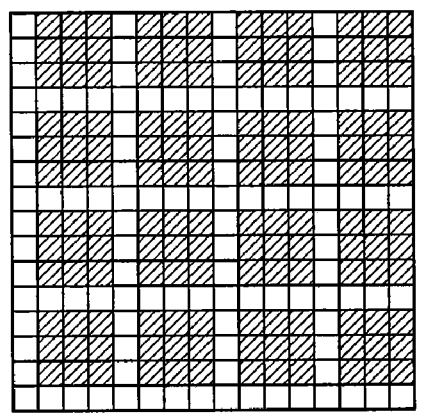
FIG. 22C is a diagram showing pixels used for computing evaluation values for a further position vector in a search sub-area obtained as a result of adoption of the second area division technique.
Figure 22D:
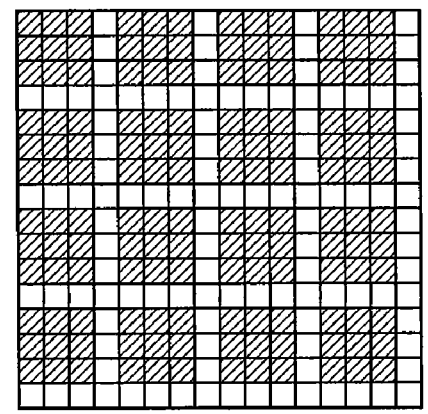
FIG. 22D is a diagram showing pixels used for computing evaluation values for a still further position vector in a search sub-area obtained as a result of adoption of the second area division technique.
Figure 23A:
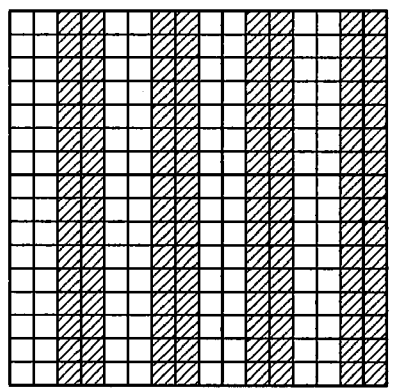
FIG. 23A is a diagram showing pixels used for computing evaluation values for a still further position vector in a search sub-area obtained as a result of adoption of the second area division technique.
Figure 23B:
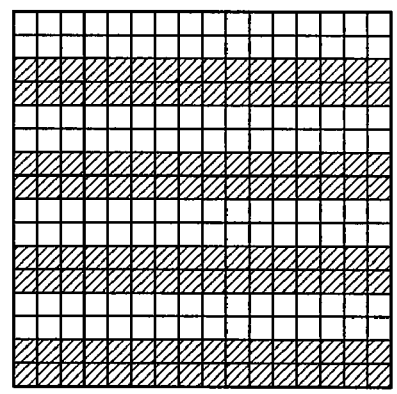
FIG. 23B is a diagram showing pixels used for computing evaluation values for a still further position vector in a search sub-area obtained as a result of adoption of the second area division technique.
Figure 23C:
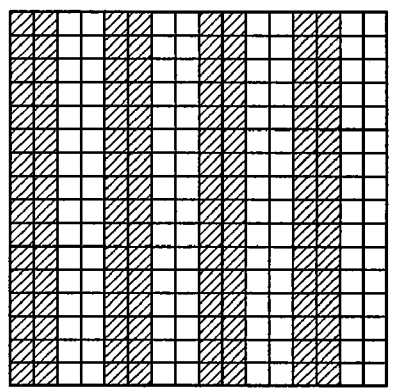
FIG. 23C is a diagram showing pixels used for computing evaluation values for a still further position vector in a search sub-area obtained as a result of adoption of the second area division technique.
Figure 23D:
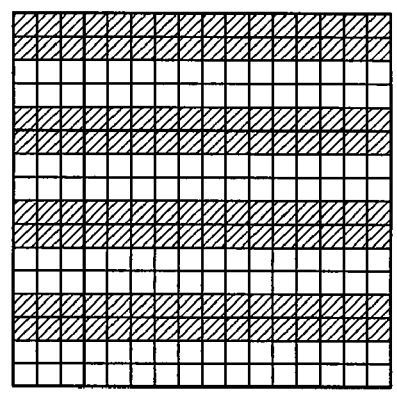
FIG. 23D is a diagram showing pixels used for computing evaluation values for a still further position vector in a search sub-area obtained as a result of adoption of the second area division technique.

The process for computing partial evaluation values is carried out for each of reference sub-blocks composing a reference macroblock in order to find partial evaluation values for each of the eight position vectors shown in FIG. 21 as position vectors associated with the reference macroblock. In this embodiment, evaluation values obtained as a result of executing this processing are not perfect evaluation values. This is because, only data in the same range as the observed macroblock is used in the computation of the evaluation values. That is to say, evaluation values found for each position vector are not computed by using data of all pixels in the macroblock. To put it concretely, evaluation values found for each position vector are computed by using only data of hatched pixels shown in FIGS. 22 and 23 as some pixels included in a macroblock. For example, FIG. 22A is a diagram showing pixels used for computing evaluation values for a position vector (−1, −1). By the same token, FIGS. 22B, 22C and 22D are diagrams showing pixels used for computing evaluation values for position vectors (1, −1), (−1, 1) and (1, 1) respectively. Likewise, FIGS. 23A, 23B, 23C and 22D are diagrams showing pixels used for computing evaluation values for position vectors (−2, 0), (0, −2), (0, 2) and (2, 0) respectively.

FIG. 24 is a diagram showing pixel counts each representing the number of pixels selected from all the 256 pixels of a macroblock as pixels to be used for computing evaluation values for each of the position vectors. The evaluation values obtained as a result of the computation are each a partial evaluation value. As shown in FIG. 21, however, the pixels used for computing evaluation values for each of the position vectors are laid out at symmetrical positions in observed and reference macroblocks. Thus, the pixels play a role to a certain degree in finding an optimum position vector indicating a direction toward a search sub-area with smaller evaluation values. If the process to determine a search sub-area to be subjected to search processing next is significant, relative information provided by the evaluation values is of importance to the process. That is to say, the absolute value of each evaluation is not so important.

Figure 25:
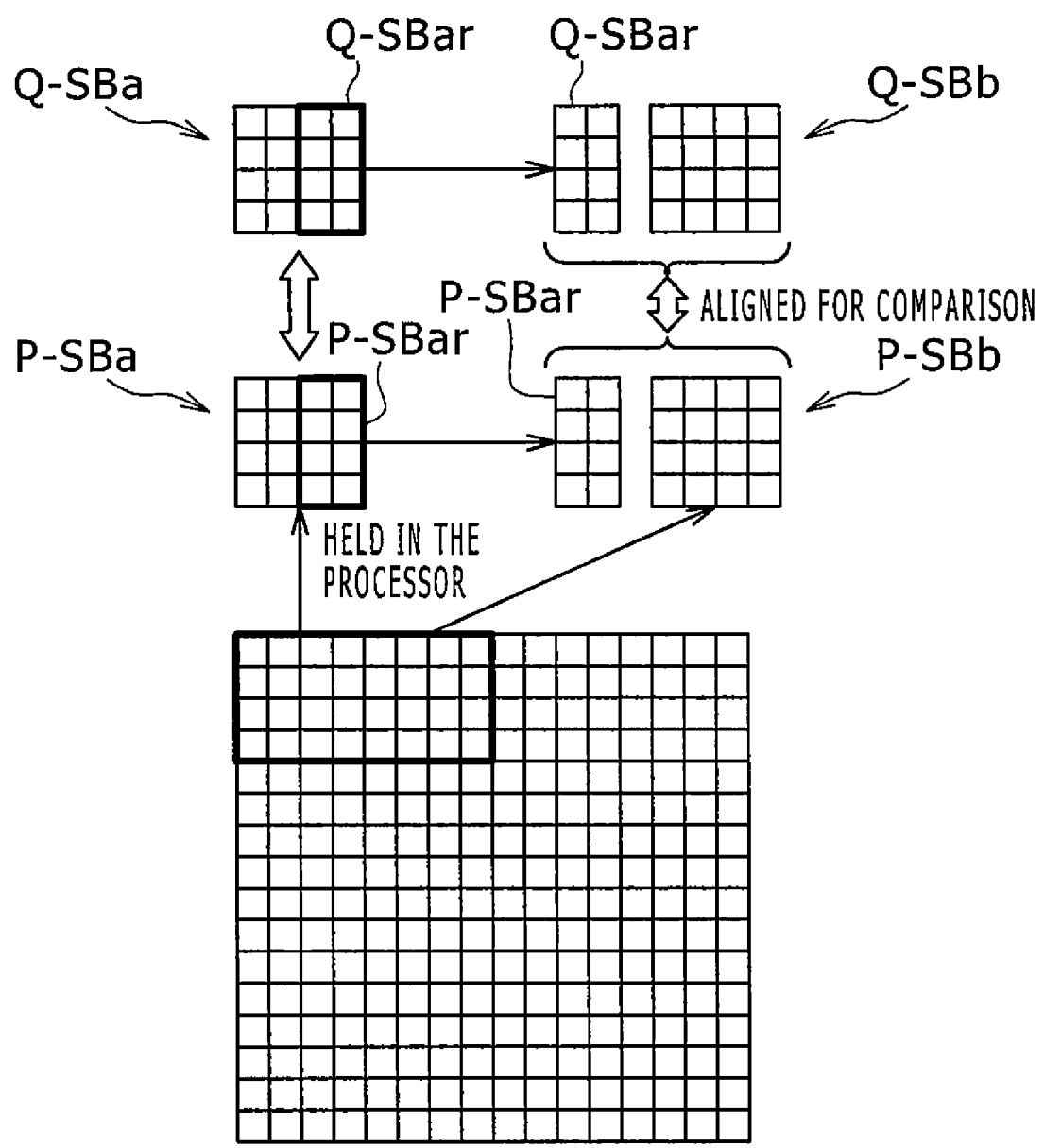
FIG. 25 is a diagram showing typical pixels to be used in a process to compute evaluation values with a higher degree of precision for position vectors in a search sub-area obtained as a result of adoption of the second area division technique.
Figure 26A:
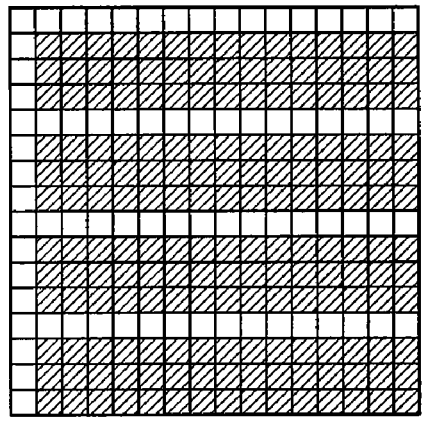
FIG. 26A is a diagram showing pixels used for computing evaluation values in the process shown in FIG. 25 for a position vector in a search sub-area obtained as a result of adoption of the second area division technique.
Figure 26B:
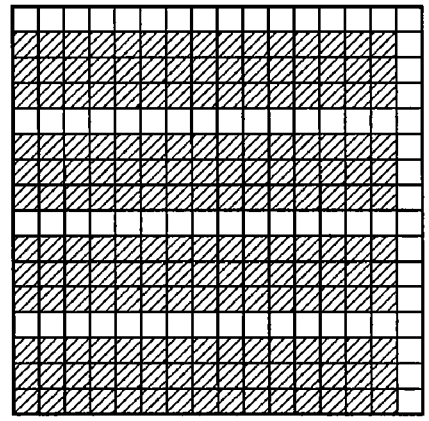
FIG. 26B is a diagram showing pixels used for computing evaluation values in the process shown in FIG. 25 for another position vector in a search sub-area obtained as a result of adoption of the second area division technique.
Figure 26C:
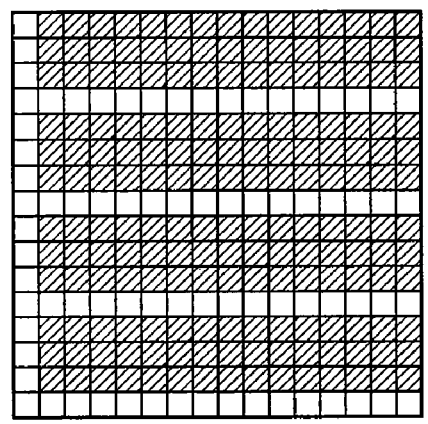
FIG. 26C is a diagram showing pixels used for computing evaluation values in the process shown in FIG. 25 for a further position vector in a search sub-area obtained as a result of adoption of the second area division technique.
Figure 26D:
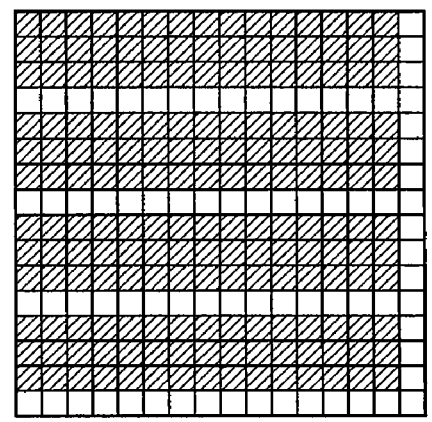
FIG. 26D is a diagram showing pixels used for computing evaluation values in the process shown in FIG. 25 for a still further position vector in a search sub-area obtained as a result of adoption of the second area division technique.
Figure 27A:
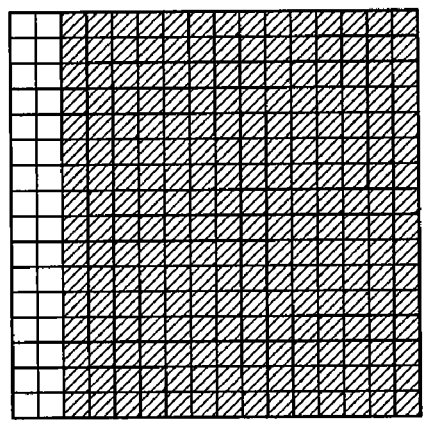
FIG. 27A is a diagram showing pixels used for computing evaluation values in the process shown in FIG. 25 for a still further position vector in a search sub-area obtained as a result of adoption of the second area division technique.
Figure 27B:
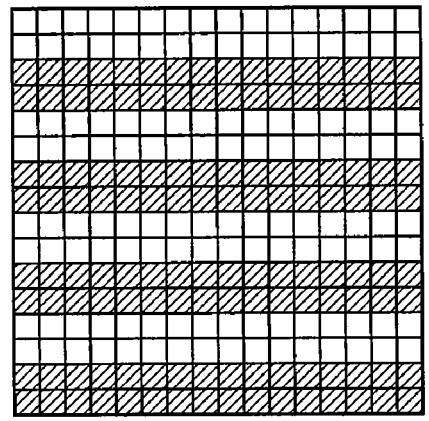
FIG. 27B is a diagram showing pixels used for computing evaluation values in the process shown in FIG. 25 for a still further position vector in a search sub-area obtained as a result of adoption of the second area division technique.
Figure 27C:
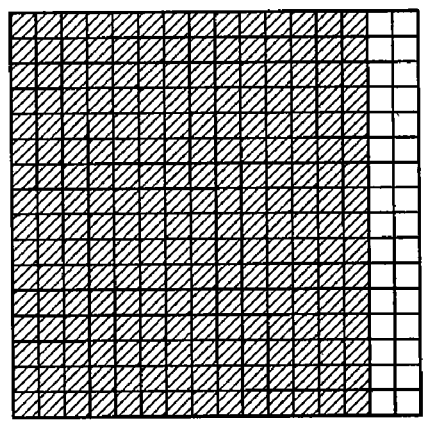
FIG. 27C is a diagram showing pixels used for computing evaluation values in the process shown in FIG. 25 for a still further position vector in a search sub-area obtained as a result of adoption of the second area division technique.
Figure 27D:
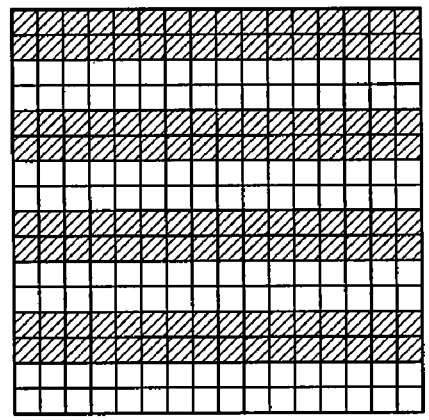
FIG. 27D is a diagram showing pixels used for computing evaluation values in the process shown in FIG. 25 for a still further position vector in a search sub-area obtained as a result of adoption of the second area division technique.

It is to be noted that, if it is necessary to obtain more accurate evaluation values by adoption of the second area division technique, it is possible to implement a method whereby, after an observed sub-block P-SBa and a reference sub-block Q-SBa are read out from the memory, partial data P-SBar of the observed sub-block P-SBa and partial data Q-SBar of the reference sub-block Q-SBa are saved in cache registers as shown in FIG. 25. For example, the partial data P-SBar of the observed sub-block P-SBa and the partial data Q-SBar of the reference sub-block Q-SBa are each data of the two rightmost pixel columns of the sub-block as shown in the figure. The partial data P-SBar and the partial data Q-SBar will be used in a process to be carried next to compute partial evaluation values. That is to say, the partial data P-SBar of eight pixels on the two rightmost pixel columns and the partial data Q-SBar of eight pixels on the two rightmost pixel columns are saved in the cache registers to be used later in a process to be carried next to compute partial evaluation values representing a relation between an observed joint-block consisting or 24 pixels and a reference joint-block also consisting of 24 pixels. The observed joint-block is a block obtained by concatenating the partial data P-SBar to an observed sub-block P-SBb whereas the reference joint-block is a block obtained by concatenating the partial data Q-SBar to a reference sub-block Q-SBb.

With the above technique adopted, evaluation values found for each position vector are computed by using only data of hatched pixels shown in FIGS. 26 and 27 as some pixels included in a macroblock. FIGS. 26A, 26B, 26C and 26D are diagrams showing pixels used for computing evaluation values for position vectors (−1, −1), (1, −1), (−1, 1) and (1, 1) respectively. By the same token, FIGS. 27A, 27B, 27C and 27D are diagrams showing pixels used for computing evaluation values for position vectors (−2, 0), (0, −2), (0, 2) and (2, 0) respectively.

FIG. 28 is a diagram showing pixel counts each representing the number of pixels selected from all the 256 pixels of a macroblock as pixels used for computing evaluation values for each of the position vectors by adoption of the method based on joint groups as described above. In comparison with the pixel counts shown in FIG. 24, the pixel counts shown in FIG. 28 shows a substantially raised degree of precision.

In the case of the second area division technique described above, only a reference sub-group located at a position coinciding with the position of an observed sub-block used in a process to compute partial evaluation values is used in the process. Thus, in order to find a total evaluation value (or a predicted value) for each position vector in the search sub-area, only 16 cycles of processing are executed where the integer 16 is the number of observed sub-blocks in the observed macroblock. That is to say, by adopting the second area division technique, the processing speed can be increased considerably at the expense of precision to a certain degree. By comparison of total evaluation values obtained for some position vectors, a search sub-area is selected as a next sub-area to be subjected to a process to search for an optimum position vector as also described earlier by referring to FIG. 20. Typically, the selected search sub-area is a sub-area separated away from the present one in a direction indicated by the optimum position vector determined for the present search sub-area.

Figure 29:
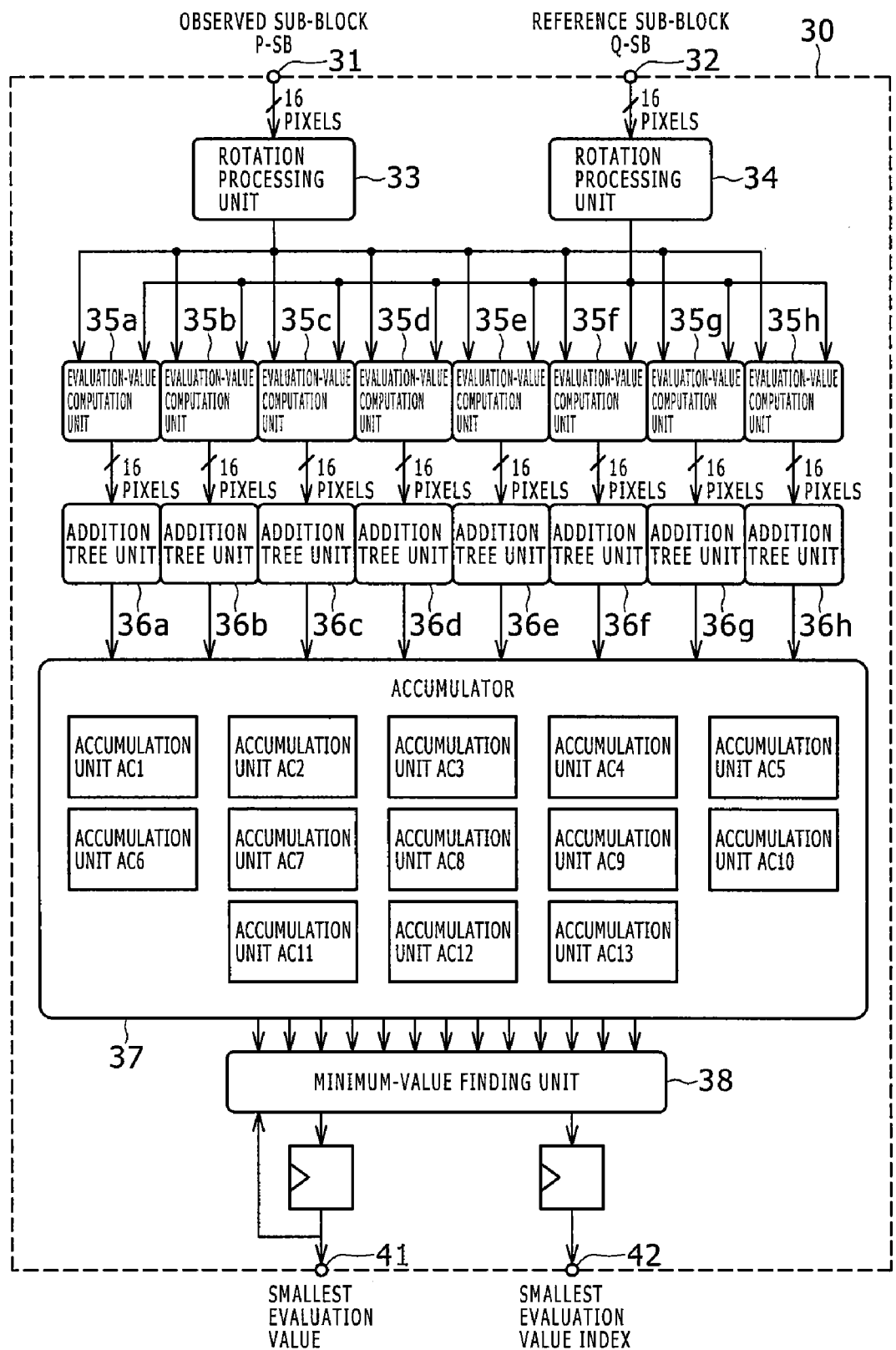
FIG. 29 is a block diagram showing a typical circuit configuration of hardware for searching for a motion vector.

By referring to FIG. 29, the following description explains a typical configuration of hardware required for carrying out a coarse-grain search process to search for a motion vector by adoption of the first and second area division techniques described before by referring to in FIGS. 8A and 8B respectively.

FIG. 29 is a block diagram showing a motion-vector evaluation-value computation processing unit 30 employed in the motion-vector detection/computation unit 12c shown in FIG. 6. The motion-vector evaluation-value computation processing unit 30 having a hardware configuration shown in FIG. 29 is a unit for concurrently computing evaluation values for eight position vectors. The "eight" is the number of position vectors, for which evaluation values can be concurrently computed at one time by adoption of the first and second area division techniques.

In the motion-vector evaluation-value computation processing unit 30 shown in FIG. 29, an observed sub-block P-SB is supplied from an input terminal 31 to evaluation-value computation units 35a to 35h employed in a pattern computation unit for computing the pixel-data patterns like the ones shown in FIG. 13 by way of a rotation processing unit 33. By the same token, a reference sub-block Q-SB is supplied from an input terminal 32 to the evaluation-value computation units 35a to 35h by way of a rotation processing unit 34.

As shown in FIG. 30, the rotation processing units 33 and 34 each employ four rotation circuits shown in FIGS. 30A to 30D respectively. As shown in FIGS. 30A to 30D, the position of each pixel in a sub-block is rotated by 0, 90, 180 or 270 degrees respectively in the range of the sub-block consisting of 4×4 pixels. It is to be noted that, in the case of the second area division technique, the rotation process is not carried out.

In a process to compute evaluation values by adoption of the first area division technique, the evaluation-value computation units 35a to 35h each compute partial evaluation values for one of the eight position vectors corresponding to respectively the eight pixel-data patterns as shown in FIG. 13 by making use of data of pixels included in the observed sub-block P-SB and data of associated pixels included in the reference sub-block Q-SB. For example, the evaluation-value computation unit 35a is a unit for computing partial evaluation values for the position vector vec (−2, −2) corresponding to one of the eight pixel-data patterns shown in FIG. 13 by making use of data of 16 pixels included in the observed sub-block P-SB and data of 16 associated pixels included in the reference sub-block Q-SB. By the same token, the evaluation-value computation unit 35b is a unit for computing partial evaluation values for the position vector vec (0, −2) corresponding to one of the eight pixel-data patterns by making use of data of eight pixels included in the observed sub-block P-SB and data of eight associated pixels included in the reference sub-block Q-SB. Similarly, the evaluation-value computation unit 35c is a unit for computing partial evaluation values for the position vector vec (−1, −1) corresponding to one of the eight pixel-data patterns by making use of data of nine pixels included in the observed sub-block P-SB and data of nine associated pixels included in the reference sub-block Q-SB. Likewise, the evaluation-value computation units 35d, 35e, 35f, 35g and 35h are units for computing partial evaluation values for respectively the position vectors vec (1, −1), vec (−2, 0), vec (0, 0), vec (−1, 1) and vec (1, 1) each corresponding to one of the eight pixel-data patterns by making use of data of respectively three, eight, four, three and one pixels included in the observed sub-block P-SB and data of respectively three, eight, four, three and one associated pixels included in the reference sub-block Q-SB.

The partial evaluation values computed by the evaluation-value computation unit 35a on the basis of pixel data are supplied to an addition tree unit 36a for summing up the partial values to result in a total evaluation value, which is then output an accumulator 37. By the same token, the partial evaluation values computed by the evaluation-value computation units 35b to 35h on the basis of pixel data are supplied to addition tree units 36b to 36h respectively to result in total evaluation values, which are then output the accumulator 37.

The accumulator 37 employs 13 accumulation units AC1 to AC13 respectively corresponding to the 13 position vectors shown in FIG. 10. By changing the reference sub-block Q-SB to another reference sub-block to obtain all the 13 pairs of pixel-data patterns shown in FIGS. 13 to 16 in the processes carried out concurrently by the evaluation-value computation units 35a to 35h to compute partial evaluation values for eight position vectors, partial evaluation values for each of the 13 position vectors can be obtained. As described above, partial evaluation values obtained for each particular one of position vectors are summed up to result in a total evaluation value for the particular position vector. Then, 13 total evaluation values each obtained for one of the 13 position vectors are cumulatively stored in the 13 accumulation units AC1 to AC13 respectively. When the process to find all the 13 total evaluation values is completed, the accumulation units AC1 to AC13 supply the stored total evaluation values to a minimum-value finding unit 38 for finding the smallest one among the total evaluation values. The smallest total evaluation value is a total evaluation value found for an optimum position vector, which is one of the 13 position vectors in the search sub-area including the reference sub-blocks Q-SB. In the following description, the optimum position vector is also referred to as a motion vector. The motion-vector evaluation-value computation processing unit 30 finally outputs the smallest total evaluation value by way of an output terminal 41 and the index of the smallest total evaluation value by way of an output terminal 42.

In the case of the second area division technique, on the other hand, a total evaluation value is found for each of the eight position vectors shown in FIG. 21 on the basis of pixel-data patterns associated with the position vectors as shown in the same figure. Then, by the same token, the motion-vector evaluation-value computation processing unit 30 outputs the smallest one of the total evaluation values by way of the output terminal 41 and the index of the smallest total evaluation value by way of the output terminal 42.

In the case of the first area division technique, the number of pixels whose data is used for calculating partial evaluation values for a position vector is a value common to all position vectors. In the case of the second area division technique, on the other hand, the number of pixels whose data is used for calculating partial evaluation values for a position vector varies from vector to vector. Thus, a smallest total evaluation value must be found typically after the partial evaluation values are normalized, or found from total evaluation values each computed as a sum of partial evaluation values calculated by using data of a predetermined fixed number of pixels. If the option to normalize the partial evaluation values is selected, partial evaluation values found for the position vectors vec (0, −2), vec (2, 0), vec (0, 2) and vec (−2, 0) shown in FIG. 21 are multiplied by a normalization factor of 16/8. Then, partial evaluation values found for the position vectors vec (1, −1), vec (1, 1), vec (−1, 1) and vec (−1, −1) shown in FIG. 21 are multiplied by a normalization factor of 16/9. Finally, a smallest total evaluation value is found on the basis of the normalized partial evaluation values. If the option to find a smallest total evaluation value from total evaluation values each computed as a sum of partial evaluation values calculated by using data of a predetermined fixed number of pixels is selected, on the other hand, a first total evaluation value is computed as a sum of partial evaluation values found for the position vectors vec (0, −2), vec (1, −1) and vec (2, 0), a second total evaluation value is computed as a sum of partial evaluation values found for the position vectors vec (2, 0), vec (1, 1) and vec (0, 2), a third total evaluation value is computed as a sum of partial evaluation values found for the position vectors vec (0, 2), vec (−1, 1) and vec (−2, 0) and a fourth total evaluation value is computed as a sum of partial evaluation values found for the position vectors vec (−2, −0), vec (−1, −1) and vec (0, −2). Finally, a smallest total evaluation value is found from the four total evaluation values, i.e., the first total evaluation value, the second total evaluation value, the third total evaluation value and the fourth total evaluation value. It is to be noted that the number of pixels with their data used for computing partial evaluation values, from which the first total evaluation value is found, is equal to the number of pixels for finding any of the second, third and fourth total evaluation values. The number of pixels for finding any of the first, second, third and fourth total evaluation values is the aforementioned predetermined fixed number of pixels.

It is to be noted that the total evaluation value can be an SAD (Sum of Differences) value or a SSD (Sum of Squared Differences).

The input terminals 31 and 32 shown in FIG. 29 correspond to respectively the input terminals 21 and 22 shown in FIG. 17 whereas the rotation processing units 33 and 34 shown in FIG. 29 correspond to respectively the rotation processing units 23 and 24 shown in FIG. 17. The evaluation-value computation units 35a to 35h shown in FIG. 29 all but correspond to the pattern computation unit 20 shown in FIG. 20.

Figure 31A:
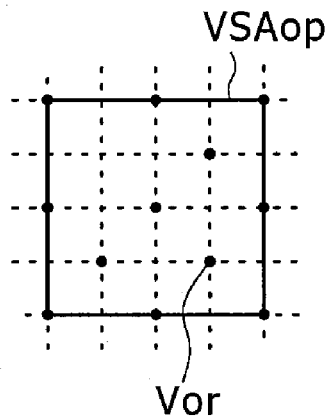
Figure 31B:
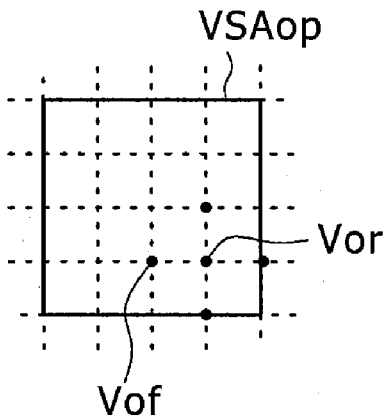
FIG. 31B is a diagram showing additional position vectors handled in a detailed search process.

After the coarse-grain search process adopting the first and second area division techniques shown in FIGS. 8A and 8B respectively is carried out, the accurate (or detailed) search process explained above is performed. The accurate search process is a process carried out by making use of data of pixels in an optimum search sub-area pointed to by a motion vector determined in the coarse-grain search process. In the case of this embodiment, the search sub-area includes 25 position vectors and an optimum position vector is selected from the 25 position vectors. For example, a motion vector Vor is determined in a coarse-grain search process from 13 position vectors in an optimum search sub-area VSAop shown in FIG. 31A. Then, four position vectors Vof existing respectively on the upper, lower, right and left sides of the motion vector Vor are determined in addition to the motion vector Vor to give a total of five position vectors shown in FIG. 31B. Then, in the accurate search process, a total evaluation value is computed for each of the five position vectors, and an optimum position vector Vof for the search sub-area VSAop is selected from the nine position vectors.

Figure 32:
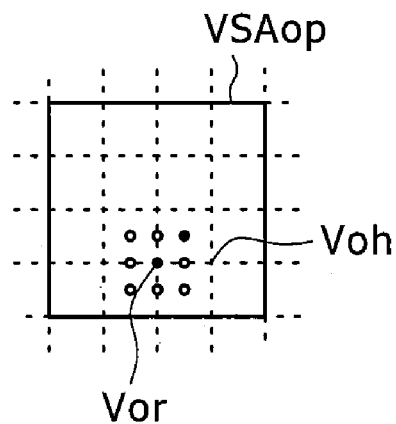
FIG. 32 is a diagram showing position vectors handled in a half-pixel search process.

Next, a more accurate search process more accurate than the accurate search process is carried out by making use of data of units each smaller than a pixel. An example of the unit smaller than a pixel is a granularity having a size equal to half a pixel. First of all, four position vectors existing respectively on the upper-left, upper-right, lower-right and lower-left sides of the motion vector Vor are added to the position vectors Vof determined in the accurate search process and the motion vector Vor to give a total of nine position vectors as shown in FIG. 32. Then, in the more accurate search process, a total evaluation value is computed for each of the nine position vectors, and an optimum position vector Voh is selected from the nine position vectors. The data unit used in the more accurate search process is by no means limited to the granularity having a size equal to half a pixel. For example, the more accurate search process can be carried out by making use of data of units each having a size equal to ¼ of the size of a pixel.

Figure 33:
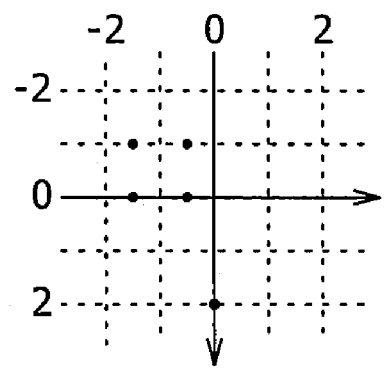
FIG. 33 is an explanatory diagram referred to in description of a process carried out to search for an optimum position vector by making use of data of units each having a size equal to half the size of a pixel in a search sub-area obtained as a result of applying the first area division technique.
Figure 34:
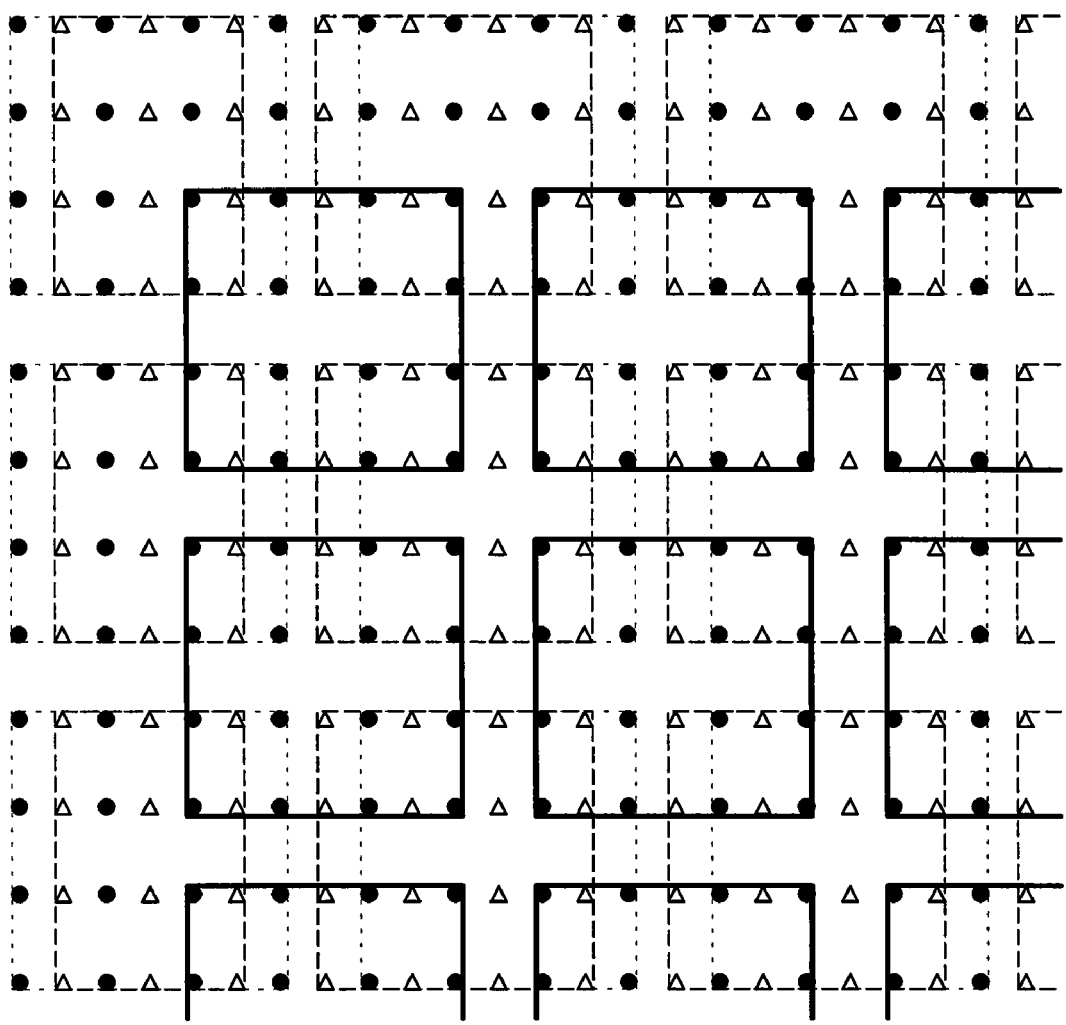
FIG. 34 is a diagram showing post-interpolation reference sub-blocks and post-interpolation observed sub-blocks.
Figure 35:
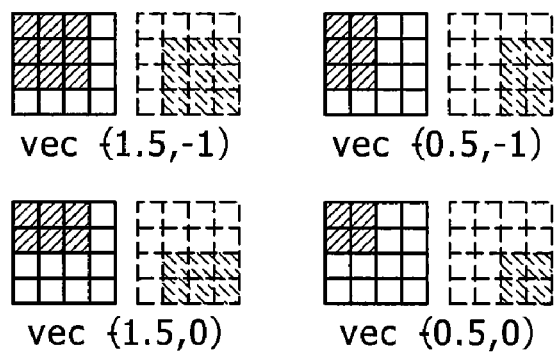
FIG. 35 is a diagram showing typical pixel-data patterns each included in an observed sub-block as a pattern to be compared with a typical pixel-data pattern in a corresponding reference sub-block in a process to compute a total evaluation value for a position vector by using processing units each having a size equal to half the size of a pixel.

The prediction technique to search for a motion vector by making use of data of units each having a size equal to a multiple of the size of a pixel can also be applied to the prediction technique to search for a motion vector by making use of data of units each having a size equal to half the size of a pixel. Let us assume for example that a process is carried out to search for an optimum position vector by making use of data of units each having a size equal to half the size of a pixel in a search sub-area obtained as a result of applying the first area division technique as shown in FIG. 33. In this case, in the same way as a process carried out to search for an optimum position vector by making use of data of units each having a size equal to a multiple of the size of a pixel, first of all, an observed sub-block at the upper-left corner of the observed macroblock and a reference sub-block located on the upper-left side of the observed sub-block are read out from a memory. Then, for the reference sub-block, a horizontal interpolation process is carried out with respect to every two adjacent pixels in order to obtain post-interpolation reference sub-blocks shown in FIG. 34 as sub-blocks each illustrated by making use of dashed lines. In FIG. 34 showing the post-interpolation reference sub-blocks each illustrated by making use of dashed lines and post-interpolation observed sub-blocks each illustrated by making use of solid lines, symbol Δ denotes a pixel obtained as a result of the horizontal interpolation process. In FIG. 34, every pre-interpolation reference sub-block is drawn by making use of thin dashed lines while every post-interpolation reference sub-block is drawn by making use of bold dashed lines. In FIG. 34, first of all, a pixel horizontal interpolation process is carried out on a pre-interpolation reference sub-block existing at the upper-left corner to result in a post-interpolation reference sub-block consisting of 12 (=3×4) post-interpolation pixels each denoted by symbol Δ. Then, partial evaluation values expressing a relation between a post-interpolation reference sub-block consisting of the 12 post-interpolation pixels and the observed sub-block are computed by making use of data of combination patterns like ones shown in FIG. 35. Also in FIG. 35, the reference sub-block is drawn by making use of dashed lines. As obvious from FIG. 35, the leftmost column of the reference sub-block is not used. Thus, the 12 post-interpolation pixels do not raise a problem of insufficiency. At that time, data of the rightmost column is saved in a cache register or the like. Then, when a post-interpolation reference sub-block located on the upper-right side of the observed sub-block as reference sub-block consisting of 16 pixels is read out from the memory, the data saved in the cache memory as the of data of the rightmost column consisting of four pixels is joined to this post-interpolation reference sub-block to result in data of 20 (=5×4) pixels. Subsequently, a horizontal interpolation process is carried out on the 20 pixels to give data of 16 (=4×4) pixels. In the same way as a process carried out to search for an optimum position vector by making use of data of units each having a size equal to a multiple of the size of a pixel, the processes to read out data from the memory, carry out the pixel interpolation and compute partial evaluation values are carried out on the reference sub-blocks located on the upper-left, upper-right, lower-right and lower-left sides of the observed sub-block to result in partial evaluation values computed by making use of data of units each having a size equal to half the size of a pixel.

By the way, the total number of pixels obtained as a result of the horizontal interpolation process as pixels of the reference data is not 400 (=20×20), but undesirably only 380 (=19×20). Nevertheless, practically, this number does not raise a problem. This is because the horizontal-direction half-pixel position vectors in the search sub-area having a height spread in the y direction from a coordinate of −2 to a coordinate of 2 and a width spread in the x direction from a coordinate of −2 to a coordinate of 2 are position vectors in a range having a width spread in the x direction from a coordinate of −1.5 to a coordinate of 1.5 and a height spread in the y direction from a coordinate of −2 to a coordinate of 2, and 19 post-interpolation pixels laid out in the horizontal direction (or the x direction) are thus sufficient to cover the position vectors in this range.

By virtue of the embodiment explained so far as an embodiment, the amount of the whole computation to search for a motion vector can be reduced and the amount of computation per cycle can also be decreased substantially. Thus, in execution of the same processing, for example, the operating frequency can be made much lower than that of the traditional technology so that the power consumption can also be reduced as well. If an MPEG-4 encoder core designed on the basis operates at a frequency of 14 MHz, the MPEG-4 encoder core is capable of encoding a moving picture having a VGA size of 640×480 pixels and a frame rate of 30 fps (frames per second). With the traditional technology, a software solution requires an operating frequency of at least several hundreds of MHz while a hardware solution requires an operating frequency approximately in the range 50 to 200 MHz. Thus, the operating frequency of 14 MHz considerably reduces the power consumption in comparison with the traditional technology. With the traditional technology, for example, the contemporary super-compact mobile apparatus such as the hand phone is not capable of recording a moving picture having a high quality over a long period of time. However, such a long recording process can be carried out in an embodiment.

In addition, if the motion-vector searching apparatus provided by the present application is allowed to operate at the same frequency as the traditional apparatus, the motion-vector searching apparatus provided by the present application is capable of processing a moving picture having a larger angle of view and a higher frame rate. That is to say, the motion-vector searching apparatus provided by the present application is capable of contributing to compression of a high-quality moving picture such as the so-called high vision picture.

The scope of present application is by no means limited to the embodiment described above. That is to say, it is possible to implement the subject matter of the present application by changing a variety of parameters such as the size of the macroblock, the size of the search area on the position-vector plane and the technique to divide the search area. In addition, the two area division techniques according to the embodiment are a certain technique and another technique implemented by shifting sub-blocks obtained as a result of the certain technique in the vertical and horizontal directions. However, the other area division technique can also be a technique implemented by shifting sub-blocks obtained as a result of the certain technique in the vertical or horizontal direction only. Thus, it is possible to provide at least three conceivable area division techniques. As an alternative, only one selected among the area division techniques is adopted. On top of that, pixel-data patterns used for searching the search sub-area for an optimum position vector are not limited to those adopted in the embodiment. That is to say, all pixel-data patterns for all position vectors or pixel-data patterns other than those adopted in the embodiment can also be utilized. In addition, it is possible to concurrently carry out a process to search for an optimum position vector by making use of data of units each having a size equal to a multiple of the size of a pixel and some processes to search for an optimum position vector by making use of data of units each having a size equal to half the size of a pixel. On top of that, while the embodiment adopts a method to go through a local vector search area in the same way as the diamond search operation, it is also possible to carry out a complete search operation to search all position vectors for an optimum one by making use of only a part of the parallel computation adopting the techniques provided by the present application. In addition, in implementation of the second area division technique, it is possible to adopt a method of computing a complete evaluation value instead of carrying out partial computation of evaluation values. Versions for implementing such modifications are described as follows.

A first modified version of the embodiment is a version adopting a method to search every hole and corner of the entire search area for a motion vector.

The embodiment described above adopts a method to go on from a certain search sub-area in a direction toward a process to search for an optimum position vector in a next search sub-area with lower evaluation values. Thus, the total evaluation value obtained as a result of the processes to search for an optimum position vector is a local minimum so that there may possibly be cases in which the resulting local minimum is not the minimum in the whole search area. In order to solve this problem, as a first modified version, every hole and corner of the entire search area is searched for a motion vector. For example, for every search sub-area obtained as a result of dividing the search area by adoption of the first area division technique shown in FIG. 8A, total evaluation values each associated with a position vector in the search sub-area are computed and an optimum position vector with a smallest total evaluation value is determined. Then, the vicinity of an area pointed to by the optimum position vector is subjected to a detailed search process in order to give a final result. In accordance with this method, the search process is carried out on the entire search area. It is thus possible to avoid the risk of obtaining a local minimum and, hence, the degree of precision can be raised. In consequence, however, the amount of processing increases by a quantity corresponding to the increase in precision.

In a second modified version described below, sub-blocks each having a size different from the size of every sub-block used in the embodiment are used.

Figures 36A, 36B:
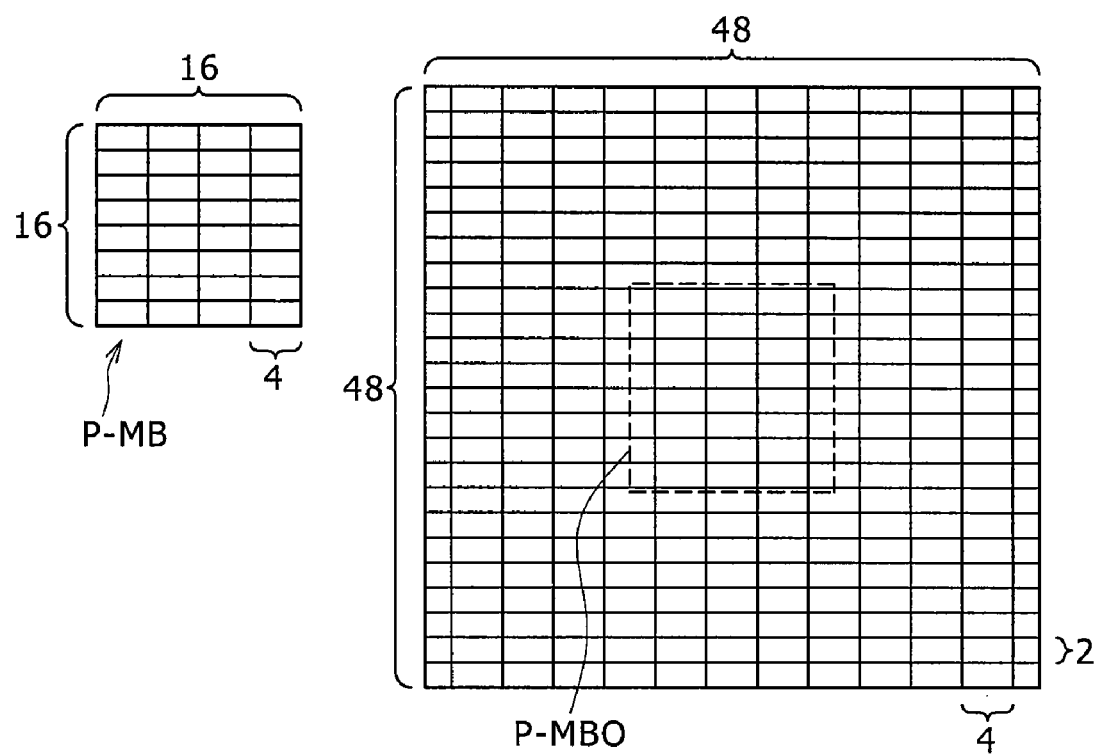
Figure 44:
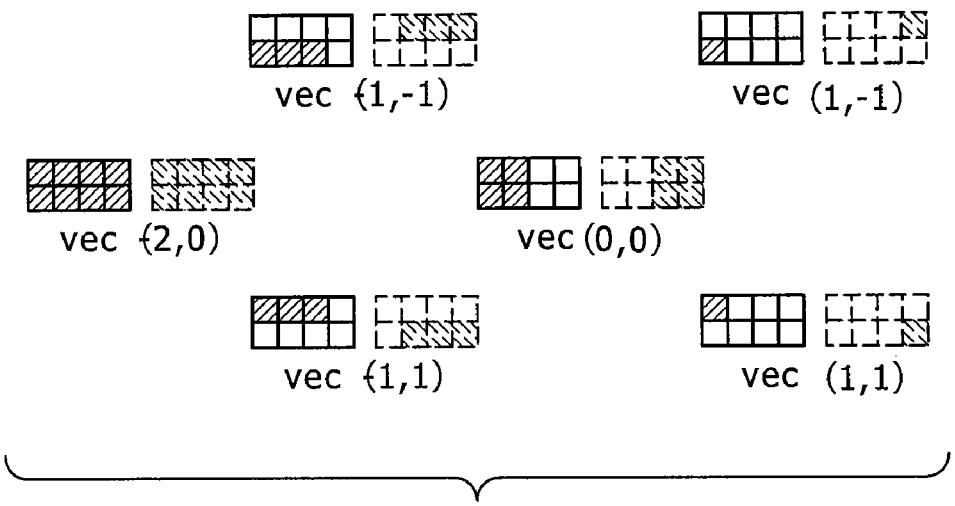
FIG. 44 is a diagram showing typical pixel-data patterns each included in an observed sub-block as a pattern to be compared with a typical pixel-data pattern in a corresponding reference sub-block in a process to compute a total evaluation value for a still further position vector in the second modified version.

In the embodiment described above, every sub-block is a matrix consisting of 4 pixel columns and 4 pixel rows. In the case of the second modified version, however, every sub-block is a matrix consisting of only 2 pixel rows and 4 pixel columns. In this case, an observed macroblock P-MB is divided into 32 observed sub-blocks as shown in FIG. 36A. A reference image is also divided into reference sub-blocks each having a size of 2×4 pixels as shown in FIG. 36B. A reference macroblock Q-MB0 in the reference image is a macroblock pointed to by a position vector (0, 0) and located at a position corresponding to the position of the observed macroblock P-MB.

In a system according to the embodiment described above, the 2 different area division techniques are adopted for dividing the search area on the position-vector plane into a plurality of search sub-areas. The 2 different area division techniques are also applied to the second modified version. In addition, position vectors to be processed in each search sub-area are the same as the position vectors used in the embodiment. That is to say, 13 position vectors are associated with a search sub-area obtained as a result of applying the first area division technique and 8 position vectors are associated with a search sub-area obtained as a result of applying the second area division technique.

FIG. 37 is a diagram showing a relation between the positions of observed sub-blocks composing an observed macroblock and the positions of reference sub-blocks obtained as a result of applying the first division technique.

Any specific one of the observed sub-blocks is associated with a total of 6 reference sub-blocks. Enumerated in the clockwise direction, the 6 reference sub-blocks are a reference sub-block located on the upper-left side of the specific observed sub-block, a reference sub-block located on the upper-right side of the specific observed sub-block, a reference sub-block overlapping the right half of the specific observed sub-block, a reference sub-block located on the lower-right side of the specific observed sub-block, a reference sub-block located on the lower-left side of the specific observed sub-block and a reference sub-block overlapping the left half of the specific observed sub-block. Since the observed macroblock P-MB is divided into 32 observed sub-blocks each associated with 6 reference sub-blocks, the processing of the observed macroblock P-MB is completed in 192 (=32×6) cycles, which are each a processing cycle of comparing any specific one of the 32 observed sub-blocks with 6 reference sub-blocks associated with the specific observed sub-block. FIG. 38 is a diagram showing a process to compare an observed sub-block with a reference sub-block located at the upper-left side of the observed sub-block.

As shown in FIGS. 39 to 44, partial evaluation values representing a relation between an observed sub-block and a reference sub-block are computed by comparison of some or all pixels in the observed sub-block with respectively some or all pixels in the reference sub-block. In FIGS. 39 to 44, an observed sub-block and its pixels are drawn by making use of solid lines while a reference sub-block and its pixels are drawn by making use of dashed lines. Hatched pixels forming a pixel-data pattern in an observed sub-block are compared with hatched pixels forming a pixel-data pattern in a reference sub-block in order to find partial evaluation values. A position vector (i, j) shown in each of FIGS. 39 to 44 for each pair of observed and reference sub-blocks is a vector with the subscript i denoting the horizontal-direction (x-direction) component and the subscript j denoting the vertical-direction (y-direction) component. That is to say, a pair of pixel-data patterns and a position vector vec (i, j) associated with the pixel-data pattern pair indicate that partial evaluation values are computed by comparison of pieces of data in the pixel-data patterns with each other for the position vector vec (i, j).

Figure 45:
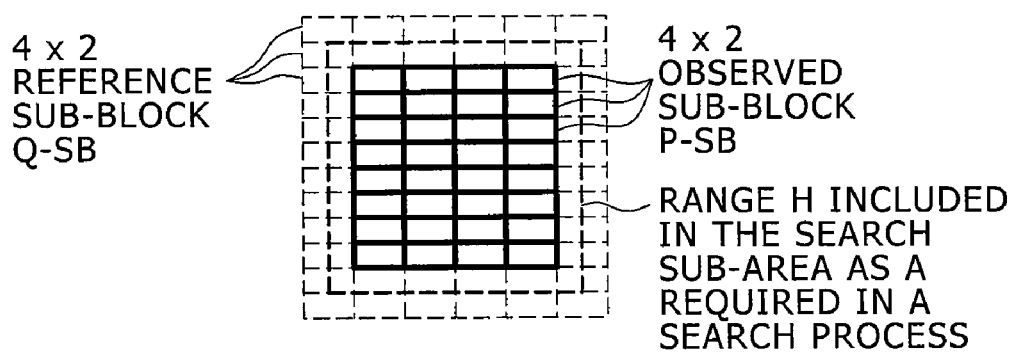
FIG. 45 is a diagram showing a relation between the positions of observed sub-blocks composing an observed macroblock and the positions of reference sub-blocks obtained as a result of applying the second division technique to the second modified version.
Figure 49A:
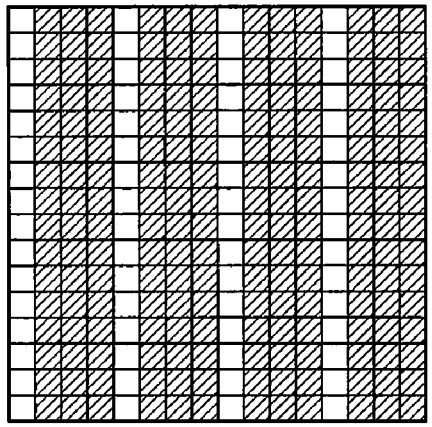
FIGS. 49A and 49B are diagrams showing only hatched pixels actually involved in computation of evaluation values for position vectors when applying the second division technique to the second modified version.
Figure 49B:
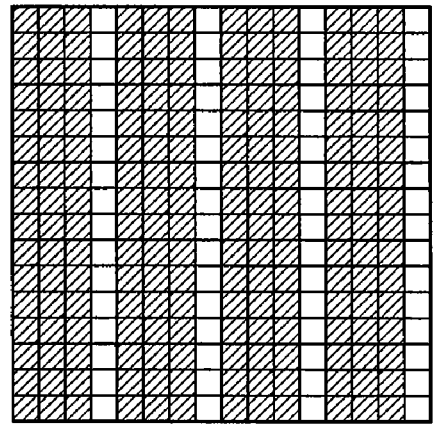
Figure 50A:
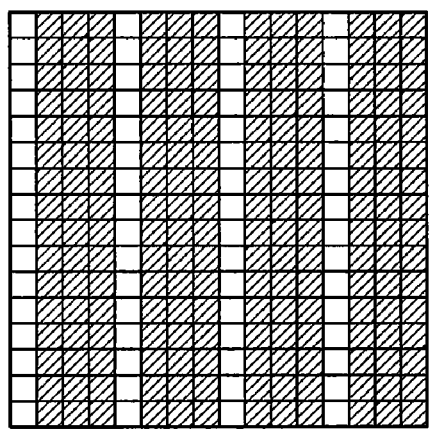
FIGS. 50A and 50B are diagrams showing only hatched pixels actually involved in computation of evaluation values for other position vectors when applying the second division technique to the second modified version.
Figure 50B:
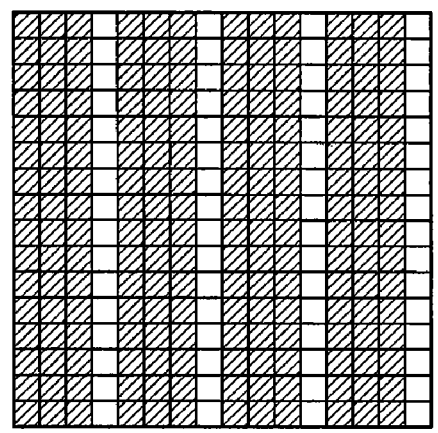
Figure 51A:
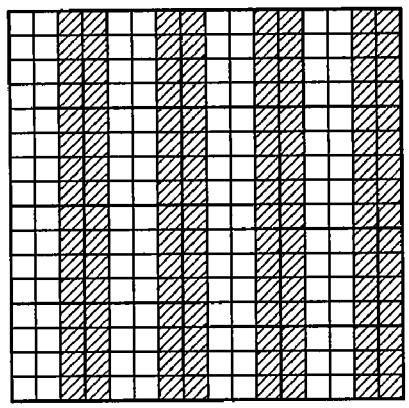
FIGS. 51A and 51B are diagrams showing only hatched pixels actually involved in computation of evaluation values for further position vectors when applying the second division technique to the second modified version.
Figure 51B:
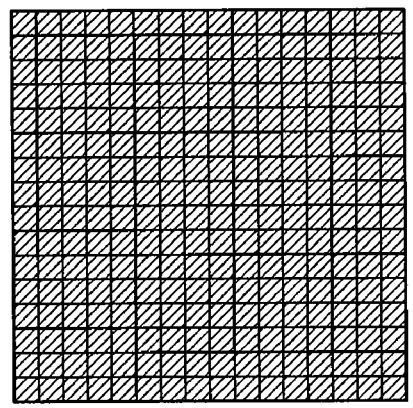
Figure 52A:
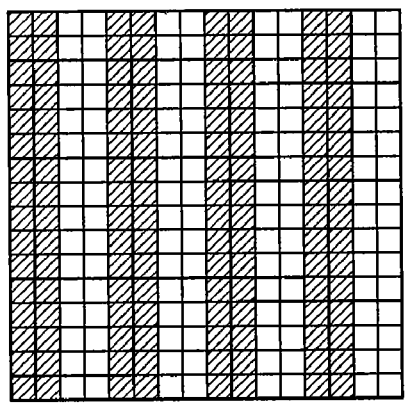
FIGS. 52A and 52B are diagrams showing only hatched pixels actually involved in computation of evaluation values for still further position vectors when applying the second division technique to the second modified version.
Figure 52B:
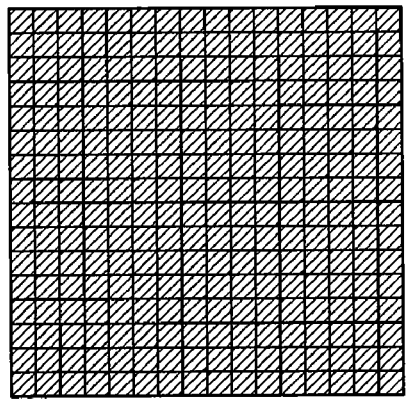
Figure 59A:
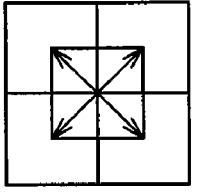
FIG. 59A is a diagram showing a process carried out to determine a search process Sb for a search sub-area to be searched next after a search process Sa is carried out as a simple search process on the present search sub-area.
Figure 59B:
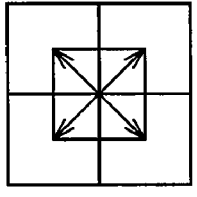
FIG. 59B is a diagram showing a process carried out to determine a search process Sa for a search sub-area to be searched next after a search process Sb is carried out as a simple search process on the present search sub-area.
Figure 59C:
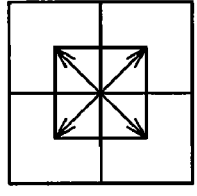
FIG. 59C is a diagram showing a process carried out to determine a search process Sd for a search sub-area to be searched next after a search process Sc is carried out as a simple search process on the present search sub-area.
Figure 59D:
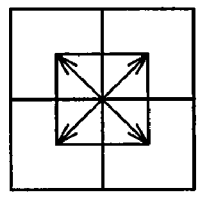
FIG. 59D is a diagram showing a process carried out to determine a search process Sc for a search sub-area to be searched next after a search process Sd is carried out as a simple search process on the present search sub-area.

FIG. 45 is a diagram showing a relation between the positions of observed sub-blocks P-SB composing an observed macroblock and the positions of reference sub-blocks Q-SB obtained as a result of applying the second division technique.

Each specific one of the observed sub-blocks is compared with 3 reference sub-blocks, i.e., the reference sub-block right above the specific observed sub-block, the reference sub-block coinciding with the specific observed sub-block and the reference sub-block right below the specific observed sub-block. Since there are 32 observed sub-blocks in an observed macroblock, the comparison process is carried out 96 (=32×3) times. If a cycle is defined as the process of comparing one observed sub-block with one reference sub-block, all the comparison processes are completed in 96 cycles.

Partial evaluation values representing a relation between an observed sub-block and a reference sub-block are computed by comparison of some or all pixels in the observed sub-block with respectively some or all pixels in the reference sub-block as shown in FIGS. 46 to 48. Much like FIGS. 39 to 44, in FIGS. 46 to 48, an observed sub-block and its pixels are drawn by making use of solid lines while a reference sub-block and its pixels are drawn by making use of dashed lines. Hatched pixels forming a pixel-data pattern in an observed sub-block are compared with hatched pixels forming a pixel-data pattern in a reference sub-block in order to find partial evaluation values. A position vector (i, j) shown in each of FIGS. 39 to 44 for each pair of observed and reference sub-blocks is a vector with the subscript i denoting the horizontal-direction (x-direction) component and the subscript j denoting the vertical-direction (y-direction) component. That is to say, a pair of pixel-data patterns and a position vector vec (i, j) associated with the pixel-data pattern pair indicate that partial evaluation values are computed by comparison of pieces of data in the pixel-data patterns with each other for the position vector vec (i, j).

With the second area division technique, the process to compute a partial evaluation value does not have to be carried out for every pixel. That is to say, for most combinations of pixel-data patterns, the process to compute a partial evaluation value is carried out only on some pixels of a sub-block. FIGS. 49 to 52 are each a diagram showing only hatched pixels included in an observed macroblock as pixels actually involved in computation of evaluation values for a position vector.

In comparison with the embodiment described earlier, with the second area division technique, the computation of partial evaluation values for an observed macroblock is carried out undesirably in many cycles. Since the degree of computation parallelism is lower, however, the size of the computation processing circuit can be reduced by an amount equivalent to the decrease in degree of computation parallelism.

In addition to the first and second area division techniques shown in FIGS. 8A and 8B respectively as techniques according to the embodiment described earlier, there are also other area division techniques explained below as techniques provided by a third modified version.

FIGS. 53A and 53B are diagrams showing respectively third and fourth area division techniques provided by the third modified version besides the first and second area division techniques shown in FIGS. 8A and 8B respectively as techniques provided to divide a search area on the position-vector plane in accordance with the embodiment described earlier.

First of all, a process is carried out to search 13 position vectors V0 to V12, which are shown in FIG. 54 as vectors of a search sub-area obtained as a result of applying the first area division technique, for an optimum one. In the following description, the process to search position vectors of a search sub-area obtained as a result of applying the first area division technique for an optimum one is referred to as a search process Sa. By the same token, a process to search position vectors of a search sub-area obtained as a result of applying the second, third or fourth area division technique for an optimum one is referred to as a search process Sb, Sc or Sd respectively. In the following description, the processes Sa, Sb, Sc and Sd are each referred to as the type of a search process.

The type of a search-process to be carried out next on a next search sub-area is determined in accordance with conditions listed below as conditions set in accordance with different positions of an optimum position vector existing on the present search sub-area as an optimum position vector resulting from a search process Sa carried out on the present search sub-area. As described earlier, an optimum position vector is defined as a vector, the total evaluation value computed for which is smallest among total evaluation values computed for all position vectors.

(1): If the optimum position vector is the position vector V0, the vicinity of an area pointed to by the position vector V0 is subjected to a more detailed search process carried out in half-pixel units in order to determine a next optimum position vector pointing to a search sub-area to be searched next.

(2): If the optimum position vector is any specific one of the position vectors V1 to V4, an adjacent search area pointed to by the specific position vector V1, V2, V3 or V4 is taken as a search sub-area to be searched next also in a search process Sa as shown in FIG. 55A.

(3): If the optimum position vector is any specific one of the position vectors V5 to V8, an adjacent search area pointed to by the specific position vector V5, V6, V7 or V8 is taken as a search sub-area to be searched next in a search process Sc or Sd. Either the search process Sc or the search process Sd is selected as follows. The total evaluation values of the position vectors V1, V2, V3 and V4 oriented in the upward, right, downward and left directions respectively as position vectors relatively close to the optimum position vector are compared with each other to determine a position vector with a smaller total evaluation value and, on the basis of the position vector with a smaller total evaluation value, either the search process Sc or the search process Sd is selected as a search process for the search sub-area to be searched next. For example, let us assume that the optimum position vector is the vector V6. In this case, the total evaluation values of the position vectors V1 and V2 relatively close to the optimum position vector V6 are compared with each other. If the result of the comparison indicates that the position vector V1 oriented in the upward direction has a total evaluation value smaller than that of the position vector V2, search sub-areas separated away from the present search sub-area in the upward direction are each taken as a search sub-area to be searched next in a search process Sd as shown in FIG. 55C. If the result of the comparison indicates that the position vector V2 oriented in the right direction has a total evaluation value smaller than that of the position vector V1, on the other hand, search sub-areas separated away from the present search sub-area in the right direction are each taken as a search sub-area to be searched next in a search process Sc as shown in FIG. 55B.

(4): If the optimum position vector is any specific one of the position vectors V9 to V12, an adjacent search area pointed to by the specific position vector V9, V10, V11 or V12 is taken as a search sub-area to be searched next in a search process Sb as shown in FIG. 55D. In this case, only partial evaluation values are computed in the search process. In the following description, a search process, in which only partial evaluation values are handled, is referred to as a simple search process. It is to be noted that, a simple search process, which is the search process Sb in the case shown in FIG. 55, is always followed by the immediately preceding search process, which is the search process Sa in this case.

By referring to FIG. 55, the following description again explains the process to determine the type of a search-process to be carried out next on a next search sub-area in accordance with the conditions set for different positions of an optimum position vector existing on the present search sub-area as an optimum position vector resulting from a search process Sa carried out on the present search sub-area. FIG. 55A is a diagram showing a typical case in which a search process Sa is again carried out in accordance with condition (2) described above. FIG. 55B is a diagram showing a typical case in which a search process Sc is carried out in accordance with condition (3) described above. FIG. 55C is a diagram showing another typical case in which a search process Sd is carried out in accordance with condition (3) described above. FIG. 55D is a diagram showing a typical case in which a search process Sb is carried out as a simple search process in accordance with condition (4) described above.

The process is carried out to determine the type of a search-process to be carried out next on a next search sub-area in accordance with the conditions set for different positions of an optimum position vector existing on the present search sub-area as an optimum position vector resulting from a search process Sb, Sc or Sd in the same way as the process to determine the type of a search process after the search process Sa described above. To be more specific, FIGS. 56A to 56D are diagrams referred to in description of processes carried out to determine the type of a search-process to be carried out next on a next search sub-area in accordance with conditions set for different positions of an optimum position vector obtained as a result of a search process Sb carried out on the present search sub-area. By the same token, FIGS. 57A to 57D are diagrams referred to in description of processes carried out to determine the type of a search-process to be carried out next on a next search sub-area in accordance with conditions set for different positions of an optimum position vector obtained as a result of a search process Sc carried out on the present search sub-area. Likewise, FIGS. 58A to 58D are diagrams referred to in description of processes carried out to determine the type of a search-process to be carried out next on a next search sub-area in accordance with conditions set for different positions of an optimum position vector obtained as a result of a search process Sd carried out on the present search sub-area. On the other hand, FIGS. 59A to 59D are each a diagram showing a process carried out to determine a search-process type for a search sub-area to be searched next after a simple search process Sa, Sb, Sc or Sd respectively is carried out on the present search sub-area. As stated earlier, a simple search process is always followed by the search process immediately preceding the simple search process. Thus, FIGS. 59A to 59D conform to FIGS. 56D, 55D, 58D and 57D respectively.

In addition, unlike the 16 directions shown in FIGS. 55 to 58 as the directions of transitions from the present search sub-area subjected to a search process to the next search sub-area subjected to the next search process, the directions of transitions from the present search sub-area subjected to a simple search process to the next search sub-area subjected the next search process, which is a search process immediately preceding the simple search process, are limited to only 4 directions shown in the diagram of each of FIGS. 59A to 59D.

A fourth modified version explained below is provided for a case in which the pixel-data patterns vary from search to search.

Figure 60:
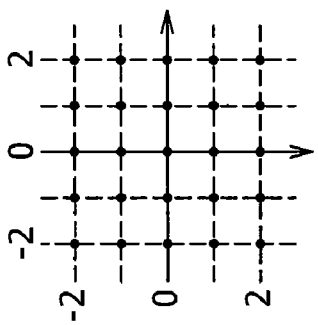
FIG. 60 is diagram showing a fourth modified version of the embodiment as a version for handling a total of 25 position vectors existing in a search sub-area obtained as a result of applying the first area division technique.

Instead of computing partial evaluation values for each of the 13 position vectors shown in FIG. 10 as position vectors in a search sub-area obtained as a result of applying the first area division technique in accordance with the embodiment described earlier, it is possible to compute partial evaluation values for each of a total of 25 position vectors existing in a search sub-area as shown in FIG. 60. By computing partial evaluation values for each of the 25 position vectors, a more accurate result can be obtained. This is because it is possible to prevent a smallest total evaluation value for an area between areas pointed to by the 13 position vectors from being ignored.

In addition, instead of computing partial evaluation values for each of the 8 position vectors shown in FIG. 18 as position vectors in a search sub-area obtained as a result of applying the second area division technique in accordance with the embodiment described earlier, it is possible to compute partial evaluation values for each of a total of 13 position vectors laid out in the search sub-area as shown in FIG. 10. It is thus quite within the bounds of possibility that some improvements can be realized to a certain degree.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A motion-vector searching method for searching for a motion vector indicating a movement to an observed image of an input picture from a reference image included in said input picture as an image separated away along a time axis from said observed image by a small time difference by comparing an observed block obtained as a result of dividing said observed image with reference blocks obtained as a result of dividing said reference image into search sub-areas, said motion-vector searching method comprising:

reading out observed processing blocks each included in said observed block to serve as an observed processing unit from an observation memory used for storing data of said observed image and reading out reference processing blocks included in each of said reference blocks as reference processing units from a reference memory used for storing data of said reference image;

concurrently computing partial evaluation values for each of a plurality of position vectors in a search sub-area by comparing a plurality of said observed processing blocks read out from said observation memory as observed processing blocks pertaining to said observed block with a plurality of said reference processing blocks read out from said reference memory as reference processing blocks pertaining to one of said reference blocks for each of said reference blocks, such that the partial evaluation values for every position vector in the search sub-area are concurrently computed;

obtaining a total evaluation value for each particular one of said position vectors as a total evaluation value associated with said particular position vector from said partial evaluation values; and finding said motion vector as an optimum position vector determined by comparison of said total evaluation values each obtained for one of said position vectors with each other;

wherein:

each of said reference processing blocks is shifted from a specific one of said observed processing blocks in a vertical and horizontal directions by a distance equal to one-half of a size of said observed processing block so as to place four of said reference processing blocks at such positions corresponding to positions in a vicinity of said specific observed processing block that a center of said four reference processing blocks coincides with a center of said specific observed processing block; and the total evaluation value associated with each particular one of said position vectors is obtained by summing up said partial evaluation values computed for said particular position vector by comparing each specific one of said observed processing blocks with said four reference processing blocks located in the vicinity of said specific observed processing block.

2. The motion-vector searching method according to claim 1 wherein: said observed processing blocks and said reference processing blocks are respectively observed sub-blocks obtained as a result of dividing said observed block and reference sub-blocks obtained as a result of dividing said observed block; and in a process of reading out said observed processing blocks and said reference processing blocks from said observation memory and said reference memory respectively, said observed sub-blocks and said reference sub-blocks are read out from said observation memory and said reference memory respectively.

3. The motion-vector searching method according to claim 1 wherein: each of said reference blocks is divided into a plurality of said reference processing blocks in accordance with a first block division technique whereby each of said reference processing blocks is shifted from a specific one of said observed processing blocks in a vertical and horizontal directions by a distance equal to one-half of a size of said observed processing block so as to place four of said reference processing blocks at such positions corresponding to positions in a vicinity of said specific observed processing block that a center of said four reference processing blocks coincides with a center of said specific said observed processing block or in accordance with a second block division technique whereby each of said reference processing blocks is not shifted from said specific observed processing block; and said motion vector is found as the optimum position vector determined by comparison of said total evaluation values from said partial evaluation values computed by comparing said observed processing blocks with said reference processing blocks resulted in by selectively applying said first or second block division technique.

4. The motion-vector searching method according to claim 1 further comprising steps of: searching coarse grain for finding an optimum position vector on a basis of said partial evaluation values computed for some position vectors; and searching fine grain for searching a vicinity of an area pointed to by said optimum position vector found in said coarse-grain searching for said motion vector, which is a more optimum position vector found at a granularity equivalent to or smaller than a size of a pixel.

5. The motion-vector searching method according to claim 1, wherein the partial evaluation values are computed by only using pixel data of a subset of pixels in the observed block.

6. A motion-vector searching apparatus for searching for a motion vector indicating a movement to an observed image of an input picture from a reference image included in said input picture as an image separated away along a time axis from said observed image by a small time difference by comparing an observed block obtained as a result of dividing said observed image with reference blocks obtained as a result of dividing said reference image into search sub-areas, said motion-vector searching apparatus comprising:

an observation memory for storing said observed image;
a reference memory for storing said reference image; and
a motion-vector detection/computation unit for:
  reading out observed processing blocks each included in said observed block to serve as an observed processing unit from said observation memory and reading out reference processing blocks included in each of said reference blocks as reference processing units from said reference memory;
  concurrently computing partial evaluation values for each of a plurality of position vectors in a search sub-area by comparing a plurality of said observed processing blocks read out from said observation memory as observed processing blocks pertaining to said observed block with a plurality of said reference processing blocks read out from said reference memory as reference processing blocks pertaining to one of said reference blocks for each of said reference blocks, such that the partial evaluation values for every position vector in the search sub-area are concurrently computed;
  obtaining a total evaluation value for each particular one of said position vectors as a total evaluation value associated with said particular position vector from said partial evaluation values; and
  finding said motion vector as an optimum position vector determined by comparison of said total evaluation values each obtained for one of said position vectors with each other;
wherein:
  each of said reference processing blocks is shifted from a specific one of said observed processing blocks in a vertical and horizontal directions by a distance equal to one-half of a size of said observed processing block so as to place four of said reference processing blocks at such positions corresponding to positions in a vicinity of said specific observed processing block that a center of said four reference processing blocks coincides with a center of said specific observed processing block; and the total evaluation value associated with each particular one of said position vectors is obtained by summing up said partial evaluation values computed for said particular position vector by comparing each specific one of said observed processing blocks with said four reference processing blocks located in the vicinity of said specific observed processing block.

7. The motion-vector searching apparatus according to claim 6 wherein:
  said observed processing blocks and said reference processing blocks are respectively observed sub-blocks obtained as a result of dividing said observed block and reference sub-blocks obtained as a result of dividing said observed block; and
  in a process of reading out said observed processing blocks and said reference processing blocks from said observation memory and said reference memory respectively, said motion-vector detection/computation unit reads out said observed sub-blocks and said reference sub-blocks from said observation memory and said reference memory respectively.

8. The motion-vector searching apparatus according to claim 6 wherein processing carried out by said motion-vector detection/computation unit to search for said motion vector comprises: a coarse-grain search process of finding an optimum position vector on a basis of said partial evaluation values computed for some position vectors; and a fine-grain search process of searching a vicinity of an area pointed to by said optimum position vector found in said coarse-grain search process for said motion vector, which is a more optimum position vector found at a granularity equivalent to or smaller than a size of a pixel.

9. The motion-vector searching apparatus according to claim 6, wherein the partial evaluation values are concurrently computed by using pixel data of three pixels in the observed sub-block.

* * * * *